(12) United States Patent
Brehmer et al.

(10) Patent No.: US 10,195,932 B2
(45) Date of Patent: Feb. 5, 2019

(54) GEARING FOR A MOTOR VEHICLE, AND A DRIVE TRAIN WITH SAME

(71) Applicant: ZF Friedrichshafen AG, Friedrichshafen (DE)

(72) Inventors: Martin Brehmer, Tettnang (DE); Matthias Horn, Tettnang (DE); Peter Ziemer, Tettnang (DE); Stefan Beck, Eriskirch (DE); Johannes Kaltenbach, Friedrichshafen (DE); Julian King, Rankweil (AT); Jens Moraw, Friedrichshafen (DE); Eckehard Münch, Bünde (DE); Juri Pawlakowitsch, Kressbronn (DE); Stephan Scharr, Friedrichshafen (DE); Viktor Warth, Friedrichshafen (DE); Michael Wechs, Weißensberg (DE); Uwe Griesmeier, Markdorf (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 31 days.

(21) Appl. No.: 15/536,818

(22) PCT Filed: Nov. 19, 2015

(86) PCT No.: PCT/EP2015/077033
§ 371 (c)(1),
(2) Date: Jun. 16, 2017

(87) PCT Pub. No.: WO2016/096313
PCT Pub. Date: Jun. 23, 2016

(65) Prior Publication Data
US 2017/0349041 A1 Dec. 7, 2017

(30) Foreign Application Priority Data
Dec. 19, 2014 (DE) .................. 10 2014 226 699

(51) Int. Cl.
*B60K 6/365* (2007.10)
*B60K 6/48* (2007.10)
(Continued)

(52) U.S. Cl.
CPC ............... *B60K 6/365* (2013.01); *B60K 6/44* (2013.01); *B60K 6/48* (2013.01); *B60K 6/547* (2013.01);
(Continued)

(58) Field of Classification Search
CPC . B60K 2006/4816; F16H 3/663; F16H 3/725; F16H 3/728; F16H 2003/445;
(Continued)

(56) References Cited

U.S. PATENT DOCUMENTS 8,371,983 B2 * 2/2013 Raghavan .............. B60K 6/365
180/65.235
8,585,520 B2  11/2013 Turnbull et al.
(Continued)

FOREIGN PATENT DOCUMENTS

DE   102007044107 A1   3/2009
DE   102010034288 A1   4/2011
(Continued)

OTHER PUBLICATIONS

German Search Report DE102014226699.8 dated May 11, 2017. (10 pages).
(Continued)

*Primary Examiner* — Mark J Beauchaine
(74) *Attorney, Agent, or Firm* — Dority & Manning, P.A.

(57) ABSTRACT

A transmission for a motor vehicle has an input shaft, output shaft, first and second minus planetary gear sets, and first electric machine with a rotationally fixed stator and a rotatable rotor connectable to the input shaft. The first planetary gear set is stepped and has planet gears of a larger
(Continued)

and a smaller effective diameter. In the first planetary gear set, first sun gear engages the larger planet gears and is connected or connectable to the rotor; second sun gear engages the smaller planet gears and is connected to a sun gear of the second planetary gear set and connectable to the input shaft; a carrier is connected to a ring gear of the second planetary gear set; and a ring gear is rotationally fixable. In the second planetary gear set, the carrier is connectable to the input shaft and the ring gear is connected to the output shaft.

24 Claims, 31 Drawing Sheets

(51) Int. Cl.
  *B60K 6/547* (2007.10)
  *F16H 3/72* (2006.01)
  *F16H 3/66* (2006.01)
  *B60K 6/44* (2007.10)
  *F16H 3/44* (2006.01)

(52) U.S. Cl.
  CPC ............ *F16H 3/663* (2013.01); *F16H 3/725* (2013.01); *F16H 3/728* (2013.01); *B60K 2006/4816* (2013.01); *B60Y 2200/92* (2013.01); *F16H 2003/445* (2013.01); *F16H 2200/0047* (2013.01); *F16H 2200/0052* (2013.01); *F16H 2200/0086* (2013.01); *F16H 2200/2007* (2013.01); *F16H 2200/2033* (2013.01); *F16H 2200/2035* (2013.01); *F16H 2200/2038* (2013.01); *F16H 2200/2041* (2013.01); *F16H 2200/2043* (2013.01); *F16H 2200/2046* (2013.01); *F16H 2200/2048* (2013.01); *F16H 2200/2064* (2013.01); *F16H 2200/2094* (2013.01); *Y02T 10/6221* (2013.01); *Y02T 10/6256* (2013.01); *Y10S 903/911* (2013.01); *Y10S 903/919* (2013.01)

(58) Field of Classification Search
  CPC ..... F16H 2200/0086; F16H 2200/2033; F16H 2200/2007; F16H 2200/0052; F16H 2200/0047; F16H 2200/2041; F16H 2200/2048; F16H 2200/2064; F16H 2200/2038; F16H 2200/2094; B60Y 2200/92; Y10S 903/911; Y10S 903/919
  See application file for complete search history.

(56) References Cited

U.S. PATENT DOCUMENTS

2007/0219036 A1    9/2007  Bucknor et al.
2013/0260948 A1*  10/2013  Ando .................. F16H 3/62
                                                    475/276

FOREIGN PATENT DOCUMENTS

| DE | 102011117863 A1 | 5/2012 |
| DE | 102013225208 A1 | 5/2015 |
| WO | WO 2006/015845 A1 | 2/2006 |
| WO | WO 2014/161739 A1 | 10/2014 |

OTHER PUBLICATIONS

International Search Report (English Translation) PCT/EP2015/077033, dated Jan. 22, 2016. (3 pages).

* cited by examiner

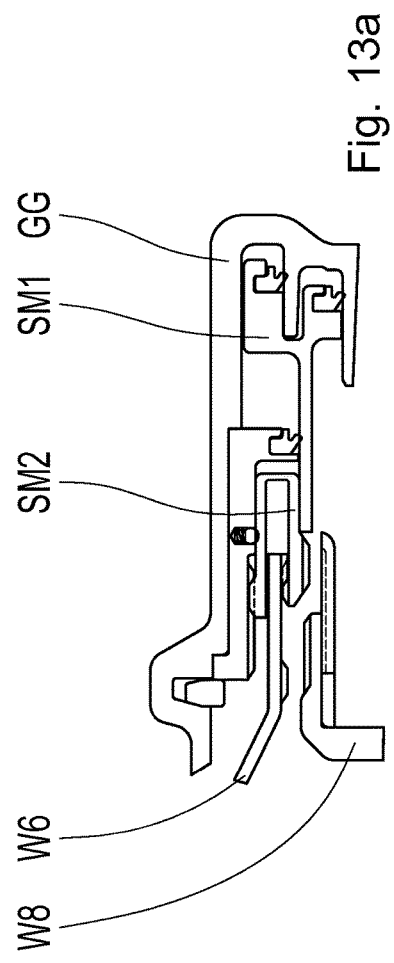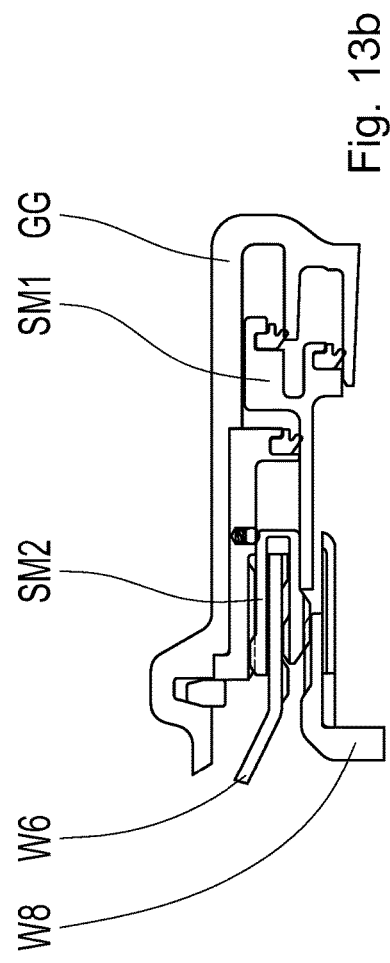

|    | EM1 | 03 | 06 | 13 | 14 | 18 |
|----|-----|----|----|----|----|----|
| G1 | o   |    | x  | x  |    |    |
| G2 | o   |    | x  |    | x  |    |
| G3 | o   |    | x  | x  |    | x  |
| G4 | o   |    |    |    |    | x  |
| G5 |     | x  |    |    |    | x  |
| EDA1 | - |    |    |    |    |    |
| EDA2 | + |    |    |    | x  |    |
| E1 | +/- |    | x  |    |    | x  |

Fig. 19b

|    | EM1 | 06 | 13 | 14 | 18 |
|----|-----|----|----|----|----|
| G1 | o   | x  | x  |    |    |
| G2 | o   | x  |    | x  |    |
| G3 | o   | x  | x  |    | x  |
| G4 | o   |    |    |    | x  |
| G5 | x   |    |    |    | x  |
| EDA1 | - |   |    |    |    |
| EDA2 | + |   |    | x  |    |
| E1 | +/- | x |    |    | x  |

Fig. 19a

|     | EM1 | 06 | 13 | 14 | 18 | 08 |
|-----|-----|----|----|----|----|-----|
| G1  | o   | x  | x  |    |    |    |
| G2  | o   | x  |    |    |    |    |
| G3  | o   | x  |    |    |    |    |
| G4  | o   |    |    | x  |    |    |
| G5  | x   |    | x  |    | x  |    |
| GR  | o   |    |    | x  | x  | x  |
| GR2 | o   |    |    | x  | x  | x  |
| EDA1| -   |    |    |    | x  |    |
| EDA2| +   |    |    |    |    |    |
| E1  | +/- | x  |    |    |    | x  |
| E2  | +/- |    |    |    |    | x  |
| P   |     | x  |    |    |    |    |

Fig. 19c

|     | EM1 | 06 | 13 | 14 | 18 | 08 | 07 |
|-----|-----|----|----|----|----|-----|-----|
| G7  |     |    |    |    |    |    | x  |
| G1  | o   | x  | x  |    |    |    |    |
| G2  | o   | x  | x  |    |    |    |    |
| G3  | o   | x  |    |    | x  |    |    |
| G4  | o   |    |    | x  |    |    |    |
| G5  | o   |    | x  |    | x  |    |    |
| GR  | x   |    |    | x  |    | x  |    |
| GR2 | o   |    |    | x  |    | x  |    |
| EDA1| -   |    |    |    | x  |    |    |
| EDA2| +   |    |    |    |    |    |    |
| E1  | +/- | x  |    |    |    | x  |    |
| E2  | +/- |    |    |    |    | x  |    |
| P   |     | x  |    |    |    |    |    |

Fig. 19d

|  | EM1 | 06 | 13 | 14 | 18 |
|---|---|---|---|---|---|
| G1 | o | x | x |  |  |
| G2 | o | x |  | x |  |
| G3 | o | x |  |  | x |
| G4 | o |  | x |  |  |
| G5 | x |  |  |  | x |
| G6 | x |  |  | x | x |
| EDA1 | - |  |  | x |  |
| EDA2 | + |  |  |  |  |
| E1 | +/- | x |  |  | x |

Fig. 20a

|  | EM1 | 03 | 06 | 13 | 14 | 18 |
|---|---|---|---|---|---|---|
| G1 | o |  | x | x |  |  |
| G2 | o |  | x |  | x |  |
| G3 | o |  | x | x |  | x |
| G4 | o | x |  |  |  | x |
| G5 |  | x |  |  | x | x |
| G6 |  |  |  |  | x |  |
| EDA1 | - |  |  |  |  |  |
| EDA2 | + |  |  |  |  |  |
| E1 | +/- |  | x |  |  | x |

| | EM1 | 06 | 13 | 14 | 18 | 08 |
|---|---|---|---|---|---|---|
| G1 | o | x | x | | | |
| G2 | o | x | | | | |
| G3 | o | x | x | | | |
| G4 | o | | | x | | |
| G5 | x | | | x | x | |
| G6 | x | | x | | x | |
| GR | o | | x | x | | x |
| GR2 | o | | | x | | x |
| EDA1 | - | | | | | |
| EDA2 | + | x | | | | |
| E1 | +/- | | | | x | x |
| E2 | +/- | | | | | x |
| P | | x | | | | x |

Fig. 20d

| | EM1 | 06 | 13 | 14 | 18 | 08 | 07 |
|---|---|---|---|---|---|---|---|
| G7 | o | | | | | | x |
| G1 | o | x | x | | | | |
| G2 | o | x | | x | | | |
| G3 | o | x | | | x | | |
| G4 | o | | x | | x | | |
| G5 | x | | | x | x | | |
| G6 | x | | x | x | | x | |
| GR | o | | | x | | x | |
| GR2 | o | | | | x | | |
| EDA1 | - | | | x | | | |
| EDA2 | + | x | | | | | |
| E1 | +/- | | | | | x | |
| E2 | +/- | x | | | | x | |
| P | | x | | | | x | |

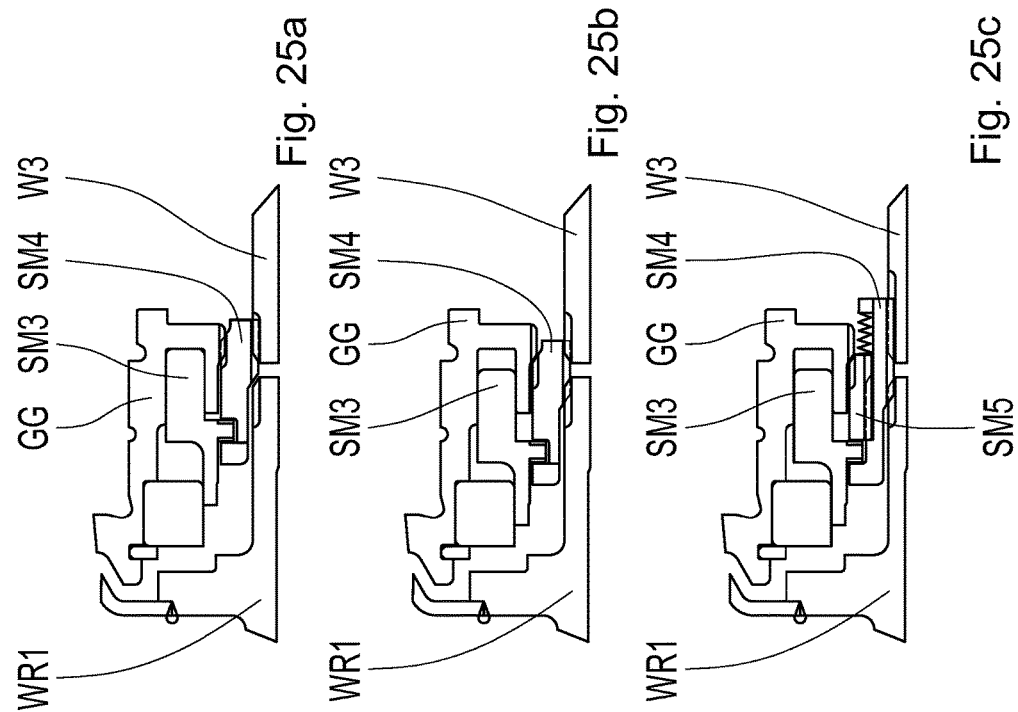

| | EM1 | 03 | 06 | 13 | 14 | 18 | K |
|---|---|---|---|---|---|---|---|
| G1 | o | | x | x | | | x |
| G2 | o | | x | | x | x | x |
| G3 | o | | x | | | x | x |
| G4 | o | | | x | x | x | |
| G5 | o | x | | (x) | | | |
| G6 | o | x | | (x) | | | x |
| EDA1 | - | | | | | x | x |
| EDA2 | + | | x | | | x | x |
| E1 | +/- | | | | | | x |

Fig. 26a

| | EM1 | 03 | 06 | 13 | 14 | 18 | 08 | K |
|---|---|---|---|---|---|---|---|---|
| G1 | o | | x | x | | | | x |
| G2 | o | | x | | x | | | x |
| G3 | o | | x | | | x | | x |
| G4 | o | | | x | | x | | x |
| G5 | o | x | | (x) | x | | | |
| G6 | o | x | | (x) | | x | | |
| GR | o | | | x | | x | | x |
| GR2 | o | | x | | x | | x | (x) |
| EDA1 | - | | | | x | | x | x |
| EDA2 | + | | | | | | | x |
| E1 | +/- | | x | | | | x | x |
| E2 | +/- | | x | | | | x | x |
| P | | (x) | | | | | | (x) |

Fig. 26b

|     | EM1 | 03  | 06  | 13  | 14  | 18  | K   |
| --- | --- | --- | --- | --- | --- | --- | --- |
| G1  | o   |     | x   | x   |     |     | x   |
| G2' | o   |     | x   | (x) | x   |     |     |
| G3' | o   |     | x   | (x) |     | x   |     |
| G4  | o   |     |     | x   |     | x   | x   |
| G5  | o   | x   |     | (x) | x   | x   |     |
| G6  | o   | x   |     | (x) | x   |     |     |
| EDA1| -   |     |     |     |     |     |     |
| EDA2| +   |     |     |     |     |     | x   |
| E1  | +/- |     | x   |     |     | x   | x   |

Fig. 27a

|     | EM1 | 03  | 06  | 13  | 14  | 18  | 08  | K   |
| --- | --- | --- | --- | --- | --- | --- | --- | --- |
| G1  | o   |     | x   | x   |     |     |     | x   |
| G2' | o   |     | x   | (x) | x   |     |     |     |
| G3' | o   |     | x   | (x) |     | x   |     |     |
| G4  | o   |     |     | x   |     | x   |     | x   |
| G5  | o   | x   |     | (x) | x   |     |     |     |
| G6  | o   | x   |     | (x) | x   |     |     |     |
| GR  | o   |     |     | x   | x   |     | x   | x   |
| GR2 | o   |     | x   |     | x   |     | x   | (x) |
| EDA1| -   |     |     |     |     |     |     | x   |
| EDA2| +   |     |     |     |     |     |     | x   |
| E1  | +/- |     | x   |     |     | x   | x   | x   |
| E2  | +/- |     |     |     |     |     | x   | x   |
| P   |     | (x) |     |     |     |     |     | (x) |

Fig. 27b

GEARING FOR A MOTOR VEHICLE, AND A DRIVE TRAIN WITH SAME

FIELD OF THE INVENTION

The present invention relates to a transmission for a motor vehicle, having an input shaft, an output shaft, two planetary gear sets, and at least four shift elements. The invention also relates to a drivetrain for a motor vehicle.

BACKGROUND

Here, a transmission refers in particular to a multi-ratio transmission in which a multiplicity of gear ratios, between the input shaft and the output shaft can be selected, preferably automatically, by shift elements. The shift elements are in this case for example clutches or brakes. Such transmissions are used in particular in motor vehicles for the purposes of suitably adapting the rotational speed and torque output characteristics of the drive unit to the driving resistances of the vehicle.

FIG. 20 of the patent application WO 2006/015845 A1 discloses a multi-ratio automatic transmission having a drive shaft, an output shaft, an upstream gear set, a main gear set and at least six shift elements, such a multi-ratio automatic transmission makes it possible to realize at least eight forward gear ratios that can be selected without performing compound shifts. The main gear set is formed by a Simpson gear set which is composed of two individual planetary gear sets. For this purpose, the sun gears of the two planetary gear sets are permanently connected and thereby form a first coupling shaft. The carrier of the first planetary gear set is permanently connected to the ring gear of the second planetary gear set, whereby a second coupling shaft is formed. Here, one of the two individual planetary gear sets is formed as a stepped planetary gear set, the planet gears of which have two different effective diameters. The output shaft is directly connected to the second coupling shaft.

The applicant's patent application DE 10 2013 225 208.0, which does not constitute a prior publication, describes in FIG. 6, a transmission having a first planetary gear set and a second planetary gear set, which are in the form of Simpson gear sets. An output shaft is permanently connected to the second coupling shaft. The transmission furthermore has an electric machine with a rotatable rotor and with a rotationally fixed stator, the rotor being connected to a sun gear of an additional planetary gear set, and the carrier and ring gear of the additional planetary gear set being connected to two shafts of the Simpson gear set. The transmission has a total of four forward gear ratios between the input shaft and the output shaft.

Both of the above mentioned transmissions have a total of three planetary gear sets, and thus require a high level of outlay in terms of construction and a suitably large installation space. Furthermore, the additional planetary gear set impairs the efficiency of the transmission.

SUMMARY OF THE INVENTION

The object of the present invention is to provide a transmission for a motor vehicle having at least five forward gear ratios, the transmission being distinguished by a simple construction, high efficiency and a high level of functionality by adept connection of an electric motor or machine. Additional objects and advantages of the invention will be set forth in part in the following description, or may be obvious from the description, or may be learned through practice of the invention.

The transmission has an input shaft, an output shaft, a first planetary gear set in the form of a stepped planetary gear set with planet gears of two different effective diameters, and a second planetary gear set. The first and the second planetary gear sets are in the form of negative or minus gear sets. A planetary gear set includes a sun gear, a carrier and a ring gear. Rotatably mounted on the carrier are planet gears which mesh with the toothing of the sun gear and/or with the toothing of the ring gear. A minus gear set refers to a planetary gear set with a sun gear, a ring gear and a carrier on which the planet gears are rotatably mounted, wherein the toothing of at least one of the planet gears meshes both with the toothing of the sun gear and with the toothing of the ring gear, whereby the ring gear and the sun gear rotate in opposite directions of rotation when the sun gear rotates while the carrier is static. A positive or plus gear set differs from the minus planetary gear set described directly above in that the plus gear set has inner and outer planet gears which are mounted rotatably on the carrier. The toothing of the inner planet gears meshes in this case at one side with the toothing of the sun gear and at the other side with the toothing of the outer planet gears. The toothing of the outer planet gears furthermore meshes with the toothing of the ring gear. This has the result that, in the presence of a static carrier, the ring gear and the sun gear rotate in the same direction.

A first sun gear of the first planetary gear set engages with the larger effective diameter of the planet gears. A second sun gear engages with the smaller effective diameter of the planet gears. The effective diameters of the first and second sun gear are correspondingly different.

The second sun gear of the first planetary gear set is permanently connected to a sun gear of the second planetary gear set, and is thus a constituent part of a first coupling shaft. A carrier of the first planetary gear set is permanently connected to a ring gear of the second planetary gear set, and is thus a constituent part of a second coupling shaft. The first and second planetary gear sets thus form a Simpson gear set.

The input shaft is connectable by a first shift element to the carrier of the second planetary gear set and by a second shift element to the second sun gear of the first planetary gear set.

The output shaft is connected to the ring gear of the second planetary gear set. Such a connection may be formed either by a permanently rotationally conjoint connection between the output shaft and the ring gear of the second planetary gear set, for example in the form of a shaft, or else by one or more toothings between the output shaft and the ring gear of the second planetary gear set.

According to the invention, the transmission has a first electric motor or machine with a rotationally fixed stator and with a rotatable rotor, the input shaft being connectable by a third shift element to the rotor of the first electric machine. The first sun gear of the first planetary gear set is either permanently connected, or connected in a shiftable manner by an auxiliary shift element, to the rotor of the first electric machine. A ring gear of the first planetary gear set can be rotationally fixed by a fourth shift element by virtue of the internal gear of the first planetary gear set being connected in a shiftable manner by the fourth shift element to a housing or to some other rotationally fixed component of the transmission.

The transmission has a compact structure because, in terms of construction, it includes only two planetary gear sets. Through the structure according to the invention, the transmission exhibits excellent efficiency, in particular because, in the individual gear ratios, there are only few toothings in the power path of the transmission. The connection of the first electric machine makes it possible to realize numerous auxiliary functions, because the rotor of the first electric machine is not connected to the input shaft in the manner that is otherwise conventional in the case of transmissions for parallel hybrid drivetrains. In this way it is, for example, possible to omit a clutch between the input shaft of the transmission and an internal combustion engine of the drivetrain of a motor vehicle.

Through the structure according to the invention, the output shaft can be arranged coaxially with respect to the input shaft, at opposite axial ends of the transmission. Alternatively, an output shaft which is axially parallel to the input shaft may also be provided. The transmission can thus be used both for a front-longitudinal drivetrain and for a front-transverse drivetrain of a motor vehicle.

In one possible embodiment, the first sun gear of the first planetary gear set can be rotationally fixed by a fifth shift element by connecting the sun gear of the first planetary gear set by the fifth shift element in a shiftable manner to the housing or to some other rotationally fixed component of the transmission. The use of the fifth shift element is optional, however, because the first sun gear of the first planetary gear set may also be supported by the first electric machine. Here, the first electric machine is preferably regulated such that the rotor has a low rotational speed. This simplifies the control of the first electric machine.

At least five forward gear ratios between the input shaft and the output shaft are selectable, preferably automatically, by selective actuation of the first, second, third, fourth and, if applicable, fifth shift element, or of the auxiliary shift element. Depending on whether the first sun gear of the first planetary gear set is permanently connected or connected in a shiftable manner to the rotor of the first electric machine, two different variants for the formation of the forward gear ratios are realized.

The formation of the forward gear ratios in the case of a transmission with a permanent connection between the rotor of the first electric machine and the first sun gear of the first planetary gear set will be described below. The first forward gear ratio is formed by closing the fourth shift element and the third shift element. The second forward gear ratio is realized by closing the fourth shift element and the second shift element. The third forward gear ratio is realized by closing the fourth shift element and the first shift element. The fourth forward gear ratio is realized by closing the first shift element and optionally the third shift element or the second shift element. The fifth forward gear ratio is realized by closing the first shift element and optionally closing the fifth shift element or by supporting the first sun gear of the first planetary gear set by the first electric machine. In this way, with suitable selection of the stationary transmission ratios of the planetary gear sets, a transmission ratio sequence which is highly suitable for use in the motor vehicle is achieved. Furthermore, two adjacent forward gear ratios always have a shift element which is closed in both of said gear ratios. This simplifies the shift process and shortens the shift duration between adjacent forward gear ratios. Since in the first to third forward gear ratios the fourth shift element is closed, it is also possible to perform a direct shift between the first and third forward gear ratios. Since in the third to fifth forward gear ratios the first shift element is closed, it is also possible to perform a direct shift between the third and the fifth forward gear ratios. The transmission thus permits a particularly advantageous variety of possible direct shift processes, even without engagement of intermediate gear ratios.

In the fourth forward gear ratio, the two planetary gear sets are blocked, such that all of the elements of the first and second planetary gear sets rotate at the same rotational speed. This can be achieved by closing two of the following shift elements: first shift element, second shift element, third shift element. This applies to all embodiments and exemplary embodiments. It is preferable for at least the first shift element to be involved in the formation of the fourth forward gear ratio, because the first shift element is also involved in the formation of the third and fifth forward gear ratios. This simplifies the shift process from the third to the fourth forward gear ratio or from the fourth to the fifth forward gear ratio and vice versa.

Rotationally fixing the first sun gear of the first planetary gear set, or substantially rotationally fixing said sun gear by the first electric machine, is required only in the fifth forward gear ratio. The torque that has to be supported here is therefore low. Therefore, an omission of the fifth shift element is not disadvantageous, because the electric machine requires only a low energy demand for supporting purposes.

The formation of the forward gear ratios in the case of a transmission having a connection between the rotor of the first electric machine and the first sun gear of the first planetary gear set, the connection being shiftable by the auxiliary shift element, and having a fifth shift element will be described below. The first forward gear ratio is realized by closing the fourth shift element, the third shift element and the auxiliary shift element. The second forward gear ratio is realized by closing the fourth shift element, the second shift element and the auxiliary shift element. The third forward gear ratio is realized by closing the fourth shift element, the first shift element and the auxiliary shift element. The fourth forward gear ratio is realized by closing the first shift element, the auxiliary shift element and optionally the third shift element or the second shift element. The fifth forward gear ratio is realized by closing the first shift element and the fifth shift element, it optionally also being possible for the third shift element to be closed. By contrast to the embodiment with a permanent connection between the rotor of the first electric machine and the first sun gear of the first planetary gear set, it is possible for the first electric machine to output power and receive power even in the mechanically fixedly defined fifth forward gear ratio if the third shift element is closed. This is of particular significance in the case of the transmission being used in the drivetrain of a motor vehicle. If the third shift element is open in the fifth forward gear ratio, then the first electric machine is decoupled from the drivetrain. In this way, the efficiency of the motor vehicle drivetrain is improved, because the electric machine does not generate any drag losses. This is particularly advantageous in the fifth gear ratio, because said gear ratio is used in the motor vehicle, for example, during travel at high speed. During such travel at constant speed, use of the first electric machine is commonly not necessary.

An alternative formation of the forward gear ratios in the case of a transmission having a selectable connection between the rotor of the first electric machine and the first sun gear of the first planetary gear set, which connection is selectable by the auxiliary shift element, and having a fifth shift element will be described below. The first forward gear ratio is realized by closing the fourth shift element, the third shift element and the auxiliary shift element. The second forward gear ratio is realized by closing the fourth shift element and the second shift element, wherein the third shift element may optionally also be closed. The third forward gear ratio is realized by closing the fourth shift element and the first shift element, wherein the third shift element may optionally also be closed. The fourth forward gear ratio is realized by closing the first shift element, the auxiliary shift element and optionally the third shift element or the second shift element. The fifth forward gear ratio is realized by closing the first shift element and the fifth shift element, wherein the third shift element may optionally also be closed. Through this alternative formation of the forward gear ratios, it is possible for the generic transmission to be operated as a conventional automatic transmission without influence from the first electric machine. By optionally closing the third shift element in the second, third and fifth forward gear ratios, the first electric machine is connected to the input shaft, whereby the first electric machine can also be incorporated into the power flow in said alternative formation of the forward gear ratios. Said alternative formation of the forward gear ratios assumes mutually independent actuation of the auxiliary shift element and of the fifth shift element.

An alternative formation of the fourth forward gear ratio in the case of a transmission having a selectable connection between the rotor of the first electric machine and the first sun gear of the first planetary gear set, which connection is selectable by the auxiliary shift element, and having a fifth shift element will be described below. If the fourth forward gear ratio is formed by closing the first shift element and the second shift element, then it is possible here for the auxiliary shift element to be open, and for the third shift element to instead optionally be closed. Here, the third shift element should in particular be closed when it is intended for the first electric machine to output or receive power.

In one embodiment of the invention, the first, second and fourth shift elements are in the form of positively engaging shift elements. Positively engaging shift elements, for example dog-clutch shift elements, are characterized by lower drag losses in the open state than frictionally engaging shift elements, whereby the friction losses of the transmission can be considerably reduced. Here, the connection of the first electric machine to the first sun gear of the first planetary gear set permits assistance of shift processes, whereby the release of load from, and synchronization of, the positively engaging shift elements is made possible without the output torque being considerably reduced. In this embodiment, the third shift element is preferably in the form of a frictionally engaging shift element, for example in the form of a multiplate clutch. In the drivetrain of a motor vehicle, the third shift element can thus serve as a launch element, because frictionally engaging shift elements have a variable torque transfer capacity, and because the third shift element is involved in the formation of the first forward gear ratio. If it is the intention that an internal combustion engine which is connected to the input shaft is being started by the first electric machine and/or by coupling to the output shaft, then the embodiment of the third shift element as a frictionally engaging shift element furthermore permits decoupling by slippage. During decoupling by slippage, the third shift element is in a slipping state, wherein it is operated with a rotational speed difference between the clutch halves. In this way, a jerk in the drivetrain caused by the starting of the internal combustion engine can be reduced.

In a preferred embodiment, the first shift element and the second shift element are actuable by a common actuation mechanism. In this embodiment, the first shift element and the third shift element are involved in the formation of the fourth forward gear ratio. Thus, the first and the second shift element are not closed at the same time in any gear ratio. In this way, it is possible for the first and second shift elements to be actuated by a common actuation mechanism which, in a first position, affects a closure of the first shift element. In a second position, the closure of the second shift element is affected. In a middle position, the actuation mechanism has the effect that neither the first nor the second shift element is closed. Through this double-acting actuator arrangement, the complexity of the transmission can be further reduced.

In an alternative embodiment, the first, second and third shift elements are in the form of frictionally engaging shift elements, in particular in the form of multiplate clutches. The fourth shift element is in the form of a positively engaging shift element in this alternative embodiment also, for example in the form of a dog clutch. This embodiment permits shifts without interruption in traction force even when the first electric machine cannot output or receive power. Such a state may arise for example in the presence of low ambient temperatures, which adversely affect the receiving of power or outputting of power by an electrochemical energy store or battery, such that the first electric machine cannot be functionally available. This is because, by the embodiment of the first, second and third elements as multiplate clutches, overlapping shifts are possible, such as are common in conventional motor vehicle automatic transmissions.

In one possible embodiment of the alternative embodiment, the transmission has a sixth forward gear ratio which is realized by closing the second shift element, and optionally by closing of the fifth shift element or by supporting the first sun gear of the first planetary gear set by the first electric machine, if the first sun gear of the first planetary gear set is permanently connected to the rotor of the first electric machine. A sixth forward gear ratio formed in this way has a particularly long transmission ratio. This is of particular significance in utilization in the drivetrain with an internal combustion engine with high traction force, because the rotational speed of the internal combustion engine can for example be reduced at high travelling speeds by a gear ratio with such a long transmission ratio. In this way, the driving comfort and the fuel consumption of the motor vehicle are improved.

In a transmission with an auxiliary shift element and a fifth shift element, the sixth forward gear ratio is formed by closing the fifth and the second shift element. If the third shift element is additionally also closed, then the first electric machine is likewise incorporated into the power path in the sixth forward gear ratio. In this way, the first electric machine can also receive or output power in the sixth forward gear ratio.

The transmission preferably has a sixth shift element by which the carrier of the second planetary gear set can be rotationally fixed by the carrier of the second planetary gear set being connected in a shiftable manner by the sixth shift element to the housing or to some other rotationally fixed component of the transmission. By closing the sixth shift element, the third shift element and if applicable the auxiliary shift element, a first reverse gear ratio between the input shaft and the output shaft is realized. The sixth shift element is to be regarded as being optional. If the transmission does not have a sixth shift element, then a reverse gear ratio may also be realized by closing the fourth shift element and, if applicable, by closing the auxiliary shift element and by operating the first electric machine. The transmission, however, also permits the formation of mechanical reverse gear ratios in a simple manner.

A second reverse gear ratio is realized by closing the sixth shift element and the second shift element. The second reverse gear ratio may be provided either in addition to or instead of the first reverse gear ratio. If it is the intention that the first electric machine assists operation in the second reverse gear ratio, then, if applicable, the auxiliary shift element must be closed.

In one possible embodiment, the second planetary gear set has a second ring gear which is connected to the output shaft. In this embodiment, the "first" ring gear of the second planetary gear set is also connected to the output shaft, because the "first" ring gear is connected to the second ring gear by the planet gears of the second planetary gear set. Here, the connection between the carrier of the second planetary gear set and the sixth shift element leads through and between the two ring gears of the second planetary gear set. The two ring gears preferably have the same effective diameter. Thus, the rotational speeds of the two ring gears are identical, as if they were connected to one another. This embodiment permits a coaxial arrangement of input shaft and output shaft despite a mechanical reverse gear ratio. Such an arrangement is advantageous in particular in vehicles with a so-called front-longitudinal drivetrain.

If the transmission has the sixth shift element, then the sixth shift element and the fourth shift element are preferably actuable by a common actuation mechanism. Since the sixth and the fourth shift element are not closed at the same time in any gear ratio, such actuation is possible without limiting the functionality of the transmission. In a first position of the actuation mechanism, the sixth shift element is closed, and the fourth shift element is open. In a second position of the actuation mechanism, the fourth shift element is closed, and the sixth shift element is open. In a middle position, both the fourth and the sixth shift element are open. Through this double-acting actuator arrangement, the complexity of the transmission can be further reduced.

In a further embodiment of the transmission, the ring gear of the first planetary gear set, which can be rotationally fixed by the fourth shift element, engages with the larger effective diameter of the planet gears. A second ring gear of the first planetary gear set engages with the smaller effective diameter of the planet gears, the second ring gear of the first planetary gear set being capable of being rotationally fixed by connecting the second ring gear of the first planetary gear set by the seventh shift element in a shiftable manner to the housing or to some other rotationally fixed component of the transmission. Through this additional, selectable shift element, the transmission is provided with an additional forward gear ratio which is distinguished by a particularly short transmission ratio. In this way, a crawling gear ratio can be realized in a simple manner.

In the first to fifth forward gear ratios, and, if applicable, also in the sixth forward gear ratio, the seventh shift element is open. In a seventh forward gear ratio, the seventh shift element, the third shift element and, if applicable, the auxiliary shift elements are closed. Here, the seventh forward gear ratio forms the abovementioned crawling gear ratio.

The transmission preferably has a second electric machine with a rotationally fixed stator and with a rotatable rotor, wherein the rotor of the second electric machine is permanently connected to the input shaft. Through the second electric machine, the functionality of the transmission is further improved. For example, the transmission can drive a vehicle by the first electric machine, while the second electric machine starts the internal combustion engine, which is connected to the input shaft, without a reaction on the output. This improves the comfort of the motor vehicle.

The transmission preferably has a first electrodynamic operating mode in which only the second shift element and if applicable the auxiliary shift element are closed and all further shift elements are open. Through variation of the torques which act on the rotor of the first electric machine and on the input shaft, it is thus possible for the torque which acts on the output shaft to be continuously varied. This enhances the functionality of the transmission.

The transmission preferably has a second electrodynamic operating mode in which only the first shift element and, if applicable, the auxiliary shift element are closed and all further shift elements are open. Through variation of the torques which act on the rotor of the first electric machine and on the input shaft, it is thus possible for the torque which acts on the output shaft to be continuously varied. This enhances the functionality of the transmission.

Through the different connection configuration, the second electrodynamic operating mode is suitable for long transmission ratios between the input shaft and the output shaft, whereas the first electrodynamic operating mode is suitable in particular for short transmission ratios between the input shaft and the output shaft. In the case of the transmission being used in the drivetrain of a motor vehicle, the first electrodynamic operating mode is thus suitable, for example, for low vehicle speeds and for the launching of the motor vehicle, whereas the second electrodynamic operating mode is suitable for relatively high vehicle speeds.

The transmission preferably has a first electric operating mode in which the fourth shift element and, if applicable, the auxiliary shift element are closed and all further shift elements are open. In said first electric operating mode, the transmission exhibits particularly high efficiency, because only the first planetary gear set is situated in the power flow. Furthermore, the input shaft and all elements connected thereto are decoupled from the output shaft, whereby any drag losses are reduced.

The transmission may also have a second electric operating mode in which the sixth shift element and, if applicable, the auxiliary shift element are closed and all further shift elements are open. In this way, the functionality of the transmission is further improved.

In one possible embodiment, the transmission can be blocked by closing the sixth and fourth shift elements simultaneously. This is particularly advantageous if the sixth and the fourth shift elements are in the form of positively engaging shift elements. In this way, a separate parking lock can be omitted. If the sixth and fourth shift elements are actuated by a common actuation mechanism, said actuation mechanism must be designed so as to permit this shift state.

It is preferable for all shift elements to be actuable by a closed hydraulic system. The closed hydraulic system has, for this purpose, a pressure accumulator which serves as a primary pressure supply. If the pressure in the pressure accumulator falls below a threshold value, then the pressure in the pressure accumulator is increased by a preferably electrically driven pump. This reduces the power demand of the hydraulic system and thus improves the efficiency of the transmission. As an alternative to this, the actuation of the shift elements may also be realized by a conventional open hydraulic system in which the pump constantly delivers hydraulic fluid. In a further alternative, the actuation of the shift elements may also be realized by an electromechanical actuation system. This realizes a further considerable improvement in the efficiency of the transmission and in the outlay in terms of construction for the same.

The transmission may be a constituent part of a drivetrain of a motor vehicle. The hybrid drivetrain has not only the transmission but also an internal combustion engine which is rotationally elastically connected to the input shaft of the transmission by a torsional vibration damper. The output shaft of the transmission is operatively connected in terms of drive to an axle transmission which distributes the torque to wheels of the motor vehicle. The drivetrain permits a plurality of drive modes of the motor vehicle. In the electric operating mode, the motor vehicle is driven by the first electric machine of the transmission alone. During purely internal-combustion-engine-powered operation, the motor vehicle is driven by the internal combustion engine alone. In the first and second electrodynamic operating modes, the motor vehicle is driven by interaction of the internal combustion engine and of the first electric machine of the transmission.

The internal combustion engine can be started both by the first and by the second electric machine. For the starting by the first electric machine during travel of the motor vehicle in the first electric operating mode, it is advantageous for the first shift element to be in the form of a frictionally engaging shift element with a variable torque transfer capacity. Here, by a slipping operation of the first shift element, torque is transmitted from the output and from the first electric machine to the internal combustion engine connected to the input shaft, in order to bring said internal combustion engine to a starting rotational speed and start. Here, the auxiliary shift element, if provided, must be in a closed state. To prevent the non-uniform torque output of the internal combustion engine during the starting process from acting at the output, the first shift element is preferably fully opened after the crankshaft of the internal combustion engine has reached the starting rotational speed. When the internal combustion engine has attained stable operation, the first shift element can be closed after a synchronous rotational speed between input shaft and crankshaft has been set. Thus, proceeding from the first electric operating mode, a starting process is possible which leads directly into the third forward gear ratio. As an alternative to this, the coupling between the first electric machine and input shaft for the starting of the internal combustion engine may be realized by the third shift element or the second shift element instead of the first shift element. Here, the shift element provided for the coupling action must be designed as a frictionally engaging shift element with variable torque transfer capacity. Thus, proceeding from the first electric operating mode, a starting process which leads directly into the first or second forward gear ratio is also possible. As an alternative to this, the crankshaft of the internal combustion engine may also be brought to a starting rotational speed by the second electric machine and subsequently started. After the synchronous rotational speed between input shaft and crankshaft has been set, the first, second or third shift element can be closed. For this purpose, the first, second or third shift element may also be in the form of a positively engaging shift element, because no decoupling by slippage with respect to the output is necessary.

The drivetrain with the transmission according to the invention also permits charging of an energy store when the vehicle is at a standstill. For this purpose, all shift elements aside from the third shift element are opened. It is thus possible for the internal combustion engine connected to the input shaft to drive the first electric machine, which is operated at a generator operating point and thus generates a charging current which can be utilized for charging the energy store.

If the intention is to launch the motor vehicle proceeding directly from the above-described charging operating mode, the third shift element is opened and the rotor rotational speed of the first electric machine is reduced to zero. In this way, all elements of the two planetary gear sets are static. Subsequently, the fourth shift element, which is preferably in the form of a positively engaging shift element, and, if applicable, the auxiliary shift element are closed. If the third shift element is in the form of a frictionally engaging shift element, it is possible by a slipping operation of the third shift element for the torque transfer capacity thereof to be increased continuously until said third shift element is finally fully closed. It is thus also the case that, proceeding from the standstill charging operating mode, a starting process which leads directly into the first forward gear ratio is possible.

As an alternative to this, proceeding from the standstill charging operating mode, it is also possible for a switch to be made directly into the first electrodynamic operating mode. For this purpose, the third shift element is opened, and if applicable the auxiliary shift element is closed. Subsequently, the rotor rotational speed of the first electric machine is increased until the synchronous rotational speed between the input shaft and the second sun gear of the first planetary gear set exists. After said synchronous rotational speed has been attained, the second shift element is closed, whereby the transmission is in the first electrodynamic operating mode. Through suitable variation of the torques of the internal combustion engine connected to the input shaft and of the first electric machine, the torque acting at the output shaft can be continuously varied, whereby the vehicle can be launched. For this purpose, the first electric machine must be operated at a generator operating point, whereby such a launch process can be performed even in the case of an empty energy store. If it is the intention to switch from the first electrodynamic operating mode into the second forward gear ratio, then the rotor rotational speed of the first electric machine is set such that the ring gear of the first planetary gear set is static. The fourth shift element can subsequently be closed, whereby the transmission is in the second forward gear ratio.

Through shift elements, a relative movement between two components is permitted, or a connection for the transmission of torque between the two components is produced, in a manner dependent on the state of actuation. A relative movement is to be understood, for example, as a rotation of two components in the case of which the rotational speed of the first component and the rotational speed of the second component differ from one another. Furthermore, the rotation of only one of the two components is also conceivable, whereas the other component is static or rotates in the opposite direction.

Two elements are referred to as being connectable if a rotationally conjoint connection exists between said elements which is releasable by a shift element. When the connection exists, such elements thus rotate at the same rotational speed.

The stationary transmission ratio defines the rotational speed ratio between sun gear and ring gear of a planetary gear set in the presence of a rotationally fixed carrier. Since, in the case of a minus gear set, the direction of rotation between the sun gear and ring gear is reversed in the presence of a rotationally fixed carrier, the stationary transmission ratio always has a negative value in the case of a minus gear set.

BRIEF DESCRIPTION OF THE DRAWINGS

The invention is described more specifically by example on the basis of the attached figures. The following is shown:

FIGS. 13a-d are detail views of the shift element arrangement;

FIG. 19a is an engagement sequence table for the transmissions of the first exemplary embodiment, which does not include the fifth shift element;

FIG. 19b is an engagement sequence table for the transmissions of the first exemplary embodiment, which includes the fifth shift element;

FIG. 19c is an engagement sequence table for the transmissions of the second to third exemplary embodiments, which includes the sixth shift element;

FIG. 19d is an engagement sequence table for a transmission of the seventh exemplary embodiment, which includes the seventh shift element;

FIG. 20a is an engagement sequence table for the transmissions of the fourth exemplary embodiment, which does not include the fifth shift element;

FIG. 20b is an engagement sequence table for the transmissions of the fourth exemplary embodiment, which includes the fifth shift element;

FIG. 20c is an engagement sequence table for the transmissions of the fifth to sixth exemplary embodiments, which includes the sixth shift element;

FIG. 20d is an engagement sequence table for a transmission of the seventh exemplary embodiment, which includes the seventh shift element;

FIGS. 25a-c are detail views of the arrangement of the auxiliary shift element and of the fifth shift element of the ninth exemplary embodiment;

FIG. 26a is an engagement sequence table for the transmissions of the eighth exemplary embodiment;

FIG. 26b is an engagement sequence table for the transmissions of the ninth exemplary embodiment;

FIG. 27a is an alternative engagement sequence table for the transmissions of the eighth exemplary embodiment;

FIG. 27b is an alternative engagement sequence table for the transmissions of the ninth exemplary embodiment.

DETAILED DESCRIPTION

Figure 1:
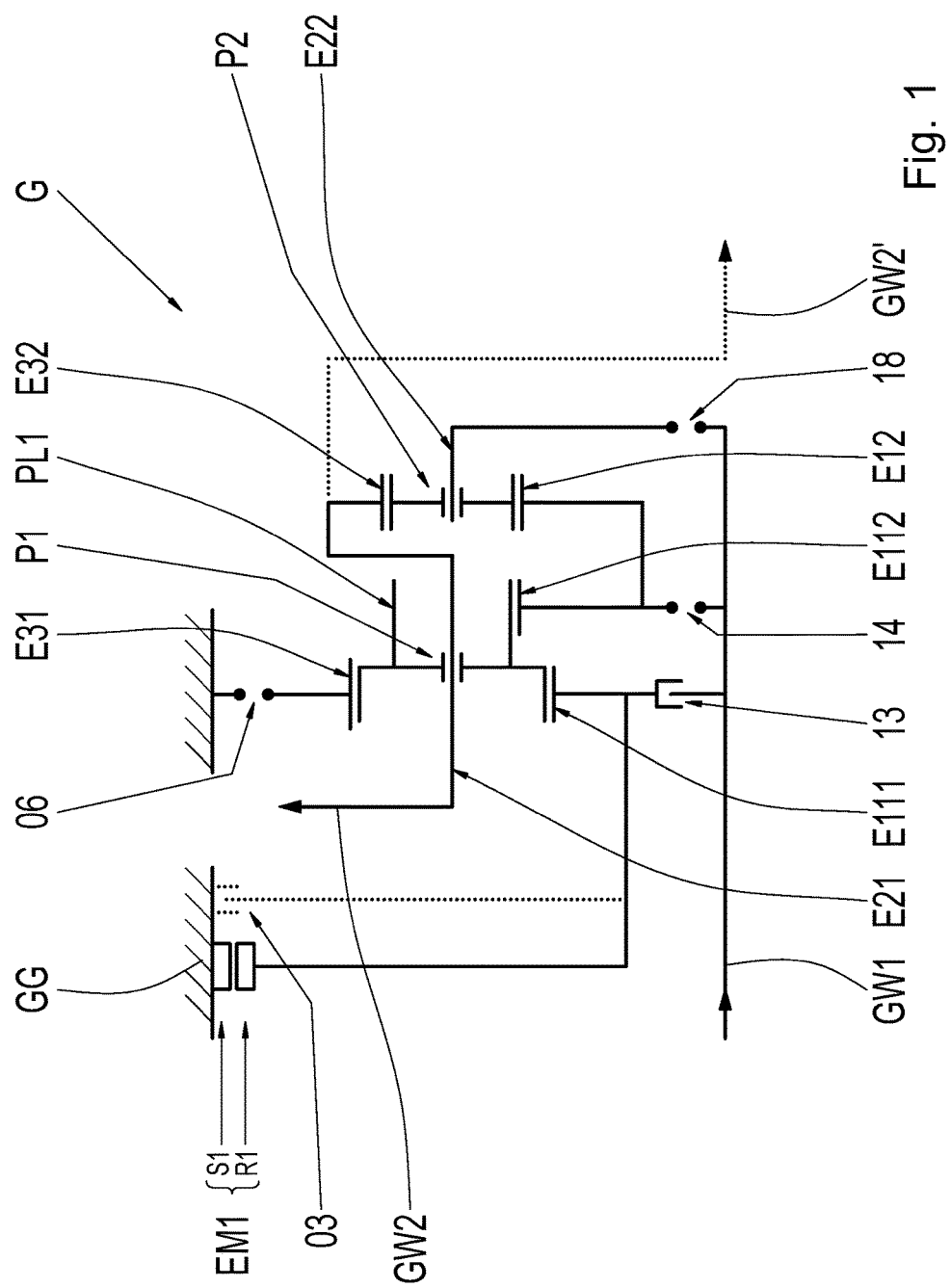
FIG. 1 is a schematic view of a transmission according to a first exemplary embodiment of the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 schematically shows a transmission G according to a first exemplary embodiment of the invention. The transmission G has an input shaft GW1, an output shaft GW2, a first planetary gear set P1 and a second planetary gear set P2. The first and second planetary gear sets P1, P2 are in the form of minus gear sets. The first planetary gear set P1 is constructed as a stepped planetary gear set, the planet gears PL1 of which have two different effective diameters. A first sun gear E111 of the first planetary gear set P1 engages with the larger effective diameter of the planet gears PL1. A second sun gear E112 of the first planetary gear set P1 engages with the smaller effective diameter of the planet gears PL1. The second sun gear E112 of the first planetary gear set P1 is permanently connected to a sun gear E12 of the second planetary gear set P2. A carrier E21 of the first planetary gear set P1 is permanently connected to a ring gear E32 of the second planetary gear set P2. The first and second planetary gear sets P1, P2 thus form a Simpson gear set.

In the embodiment of the transmission G as per FIG. 1, there are two possibilities for the arrangement of the output shaft GW2. A first possibility for the formation of the output shaft GW2 is realized by a toothing (not illustrated) which is formed on a section of that coupling shaft which connects the carrier E21 of the first planetary gear set P1 to the ring gear E32 of the second planetary gear set P2. A second possibility, which is denoted in FIG. 1 as output shaft GW2', exists by a coaxial arrangement of the output shaft GW2' with respect to the input shaft GW1 at opposite axial ends of the transmission G.

Through a first shift element 18, the input shaft GW1 is connectable to the carrier E22 of the second planetary gear set P2. Through a second shift element 14, the input shaft GW1 is connectable to the second sun gear E112 of the first planetary gear set P1. Through a third shift element 13, the input shaft GW1 is connectable to the first sun gear E111 of the first planetary gear set P1. Through a fourth shift element

06, a ring gear E31 of the first planetary gear set P1 can be rotationally fixed by connecting said ring gear E31 in a shiftable manner by the fourth shift element 06 to a housing GG of the transmission G. Optionally, a fifth shift element 03 is provided, through which the first sun gear E111 of the first planetary gear set P1 can be rotationally fixed by connecting said first sun gear E111 in a shiftable manner by the fifth shift element 03 to the housing GG.

The first, second and fourth shift elements 18, 14, 06 are in the form of positively engaging shift elements, in particular dog-clutch shift elements. The third shift element 13 is in the form of a frictionally engaging shift element, in particular in the form of a multiplate clutch. The fifth shift element 03, if provided, is likewise in the form of a frictionally engaging shift element, particularly in the form of a multiplate brake or band brake. As an alternative to this, the fifth shift element 03 may also be in the form of a positively engaging shift element.

The transmission G furthermore includes a first electric machine EM1 which has a rotatably mounted rotor R1 and a rotationally fixed stator S1. The rotor R1 is permanently rotationally conjointly connected to the first sun gear E111 of the first planetary gear set P1.

Figure 2:
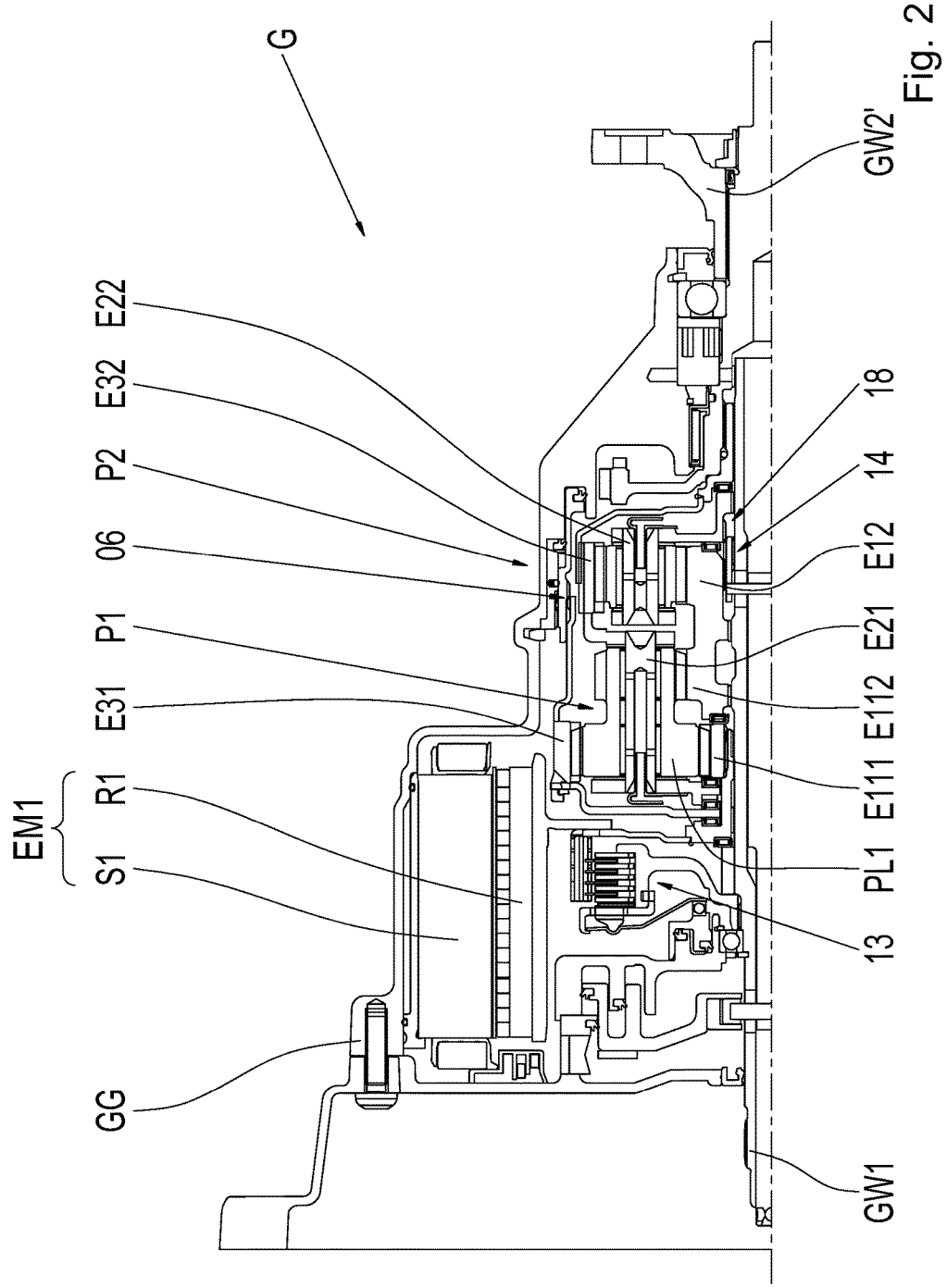
FIG. 2 is a sectional view of the transmission according to the first exemplary embodiment.

FIG. 2 shows a sectional view of the transmission G according to the first exemplary embodiment, without the fifth shift element 03, wherein the variant with coaxial input shaft GW1 and output shaft GW2' at opposite axial ends of the transmission G is shown. The transmission G is therefore suitable for use in a front-longitudinal drivetrain of a motor vehicle. Only one half of the sectional view is shown. In FIG. 2, it can be clearly seen that the third shift element 13 is in the form of a frictionally engaging shift element, which is held in the open state by spring devices and which can be transferred hydraulically into the closed state by displacement of an actuation piston. The first and second shift elements 18, 14 are in the form of dog-clutch shift elements and are actuated by axial displacement of a drive element which extends through the input shaft GW1, which is designed as a hollow shaft. Here, the first and second shift elements 18, 14 are arranged in space-saving fashion radially within the second planetary gear set P2. The fourth shift element 06 is likewise in the form of a dog-clutch shift element and is arranged radially between the second planetary gear set P2 and the housing GG.

Figure 3:
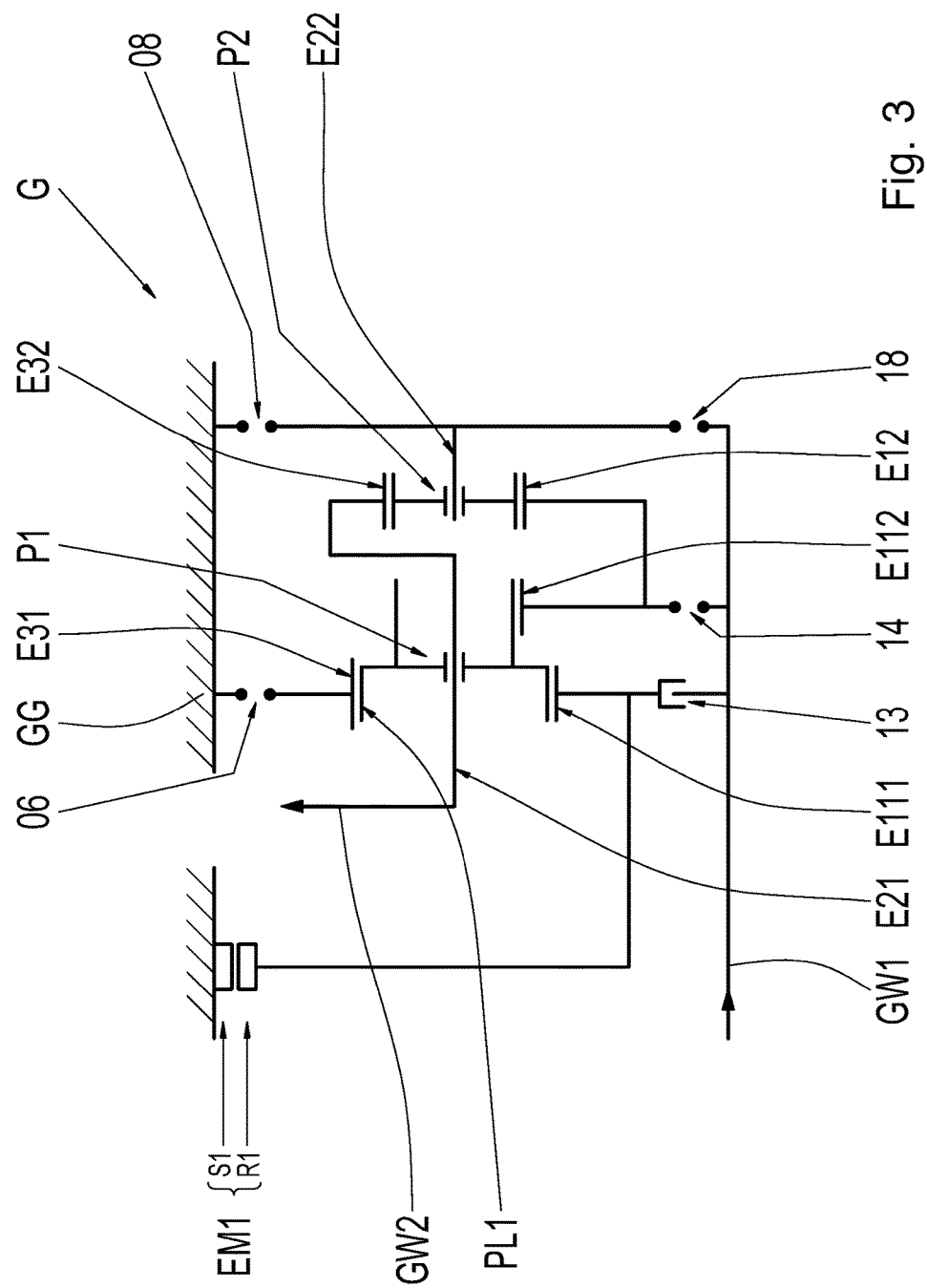
FIG. 3 is a schematic view of a transmission according to a second exemplary embodiment of the invention.

FIG. 3 schematically shows a transmission G according to a second exemplary embodiment of the invention. By contrast to the first exemplary embodiment shown in FIG. 1, the transmission G according to the second exemplary embodiment has a sixth shift element 08 which is designed to rotationally fix the carrier E22 of the second planetary gear set P2 by connecting the carrier E22 of the second planetary gear set P2 in a shiftable manner to the housing GG. The sixth shift element 08 is in the form of a positively engaging shift element, in particular a dog-clutch shift element. The sixth shift element 08 makes it possible to form a reverse gear ratio GR between the input shaft GW1 and the output shaft GW2.

Figure 4:
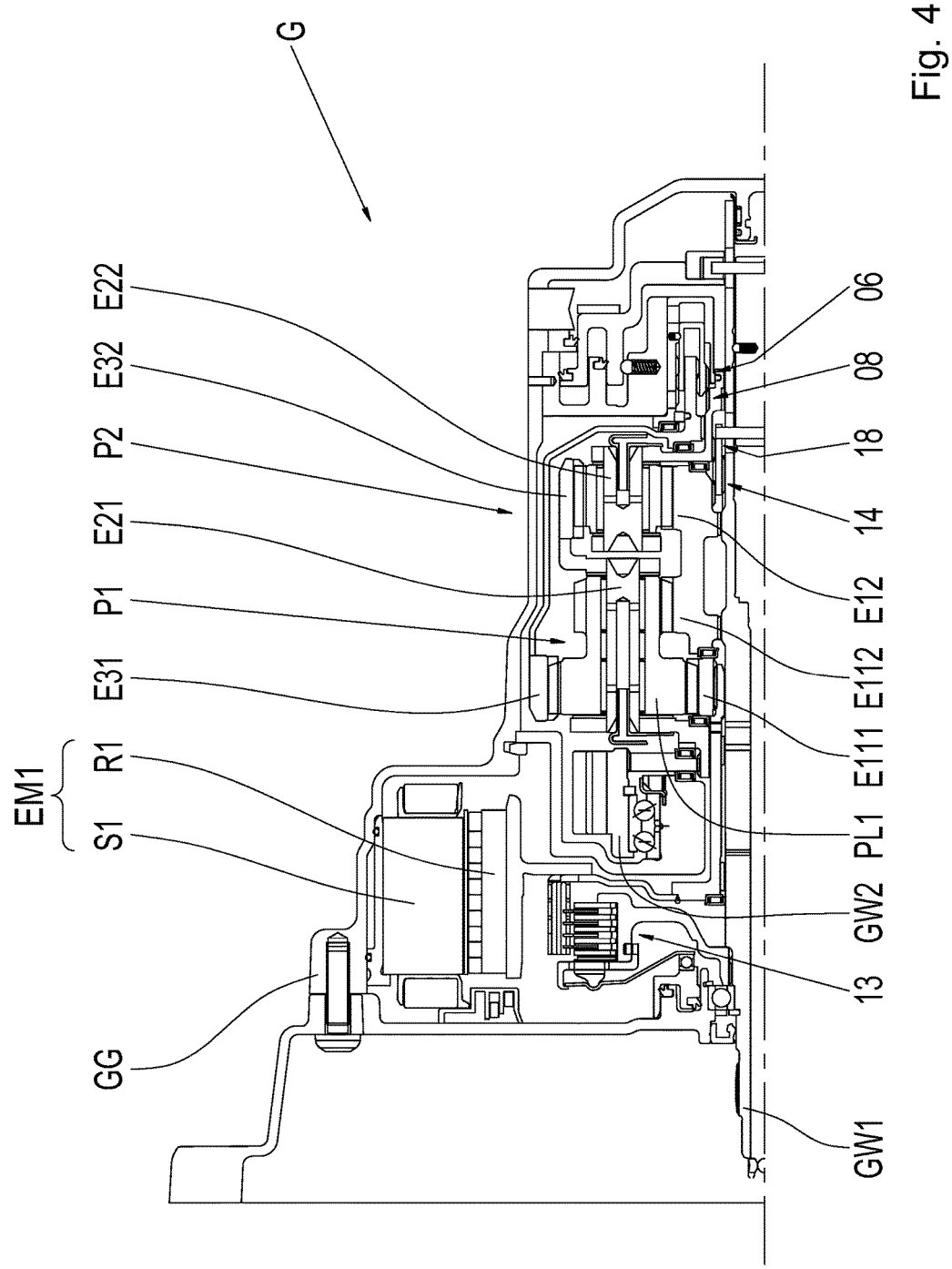
FIG. 4 is a sectional view of the transmission according to the second exemplary embodiment.

FIG. 4 shows a sectional view of the transmission G according to the second exemplary embodiment. The output shaft GW2 is arranged in the form of a toothing which is permanently rotationally conjointly connected to the ring gear E32 of the second planetary gear set P2 by a connecting shaft. The transmission G is therefore suitable for use in a front-transverse drivetrain of a motor vehicle. The sixth shift element 08 is, together with the fourth shift element 06, arranged radially close to the input shaft GW1, which extends axially through the entire transmission G. Therefore, all dog-clutch shift elements 18, 14, 06, 08 have a small effective diameter. This reduces the production costs and improves the functionality of the shift elements because, owing to the small effective diameter, said shift elements are substantially insensitive with respect to incorrect axial positioning. The hydraulic actuation device for the shift elements 18, 14, 06, 08 is arranged at that axial end of the transmission G which is situated opposite the input side of the transmission G. The first and second shift elements 18, 14 are actuated by axial displacement of a driver which extends through the input shaft GW1, which is designed as a hollow shaft.

Figure 5:
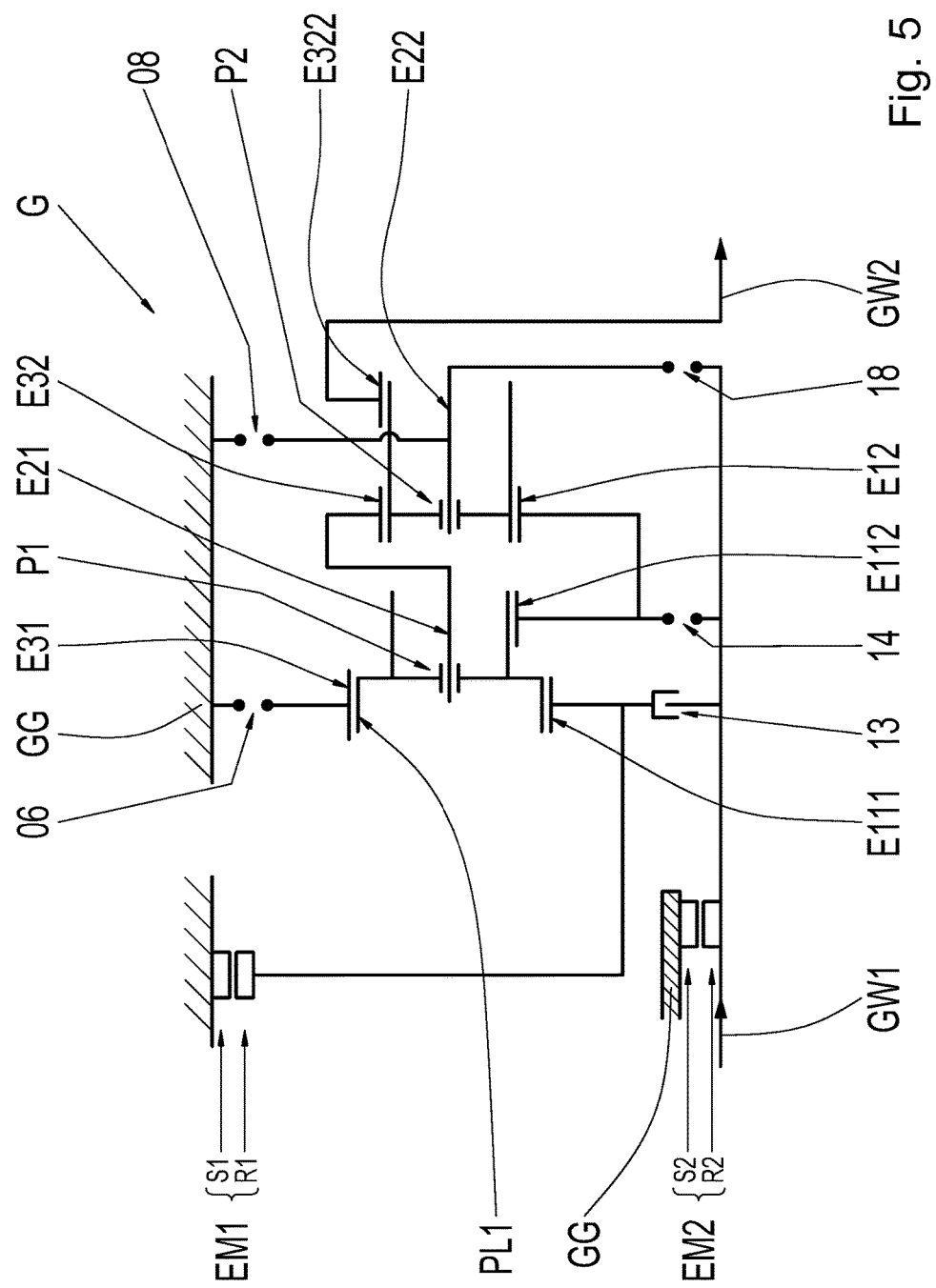
FIG. 5 is a schematic view of a transmission according to a third exemplary embodiment of the invention.

FIG. 5 schematically shows a transmission G according to a third exemplary embodiment of the invention. By contrast to the second exemplary embodiment shown in FIG. 3, the transmission G according to the third exemplary embodiment has a second ring gear E322, which is assigned to the second planetary gear set P2. The second ring gear E322 is directly connected to the output shaft GW2. In this way, even in the embodiment of the transmission G with a sixth shift element 08, a coaxial arrangement of input shaft GW1 and output shaft GW2 at opposite axial ends of the transmission G is possible. The ring gear E32 of the second planetary gear set P2 is in this case still connected by the planet gears of the second planetary gear set P2 to the output shaft GW2. The connection of the carrier E22 of the second planetary gear set P2 to the sixth shift element 08 runs through between the ring gears E32, E322 of the second planetary gear set P2.

In third exemplary embodiment shown in FIG. 5, the transmission furthermore has a second electric machine EM2 with a rotatable rotor R2 and a rotationally fixed stator S2. The rotor R2 is in this case permanently connected to the input shaft GW1 of the transmission G. The functional variability of the transmission G is further enhanced by the second electric machine EM2. The second electric machine EM2 is in this case merely an optional constituent part of the transmission G, and may be provided in the same way for all embodiments or exemplary embodiments.

The fifth shift element 03 may optionally be provided both in the second and in the third exemplary embodiments, specifically in the same way as in the first exemplary embodiment.

Figure 6:
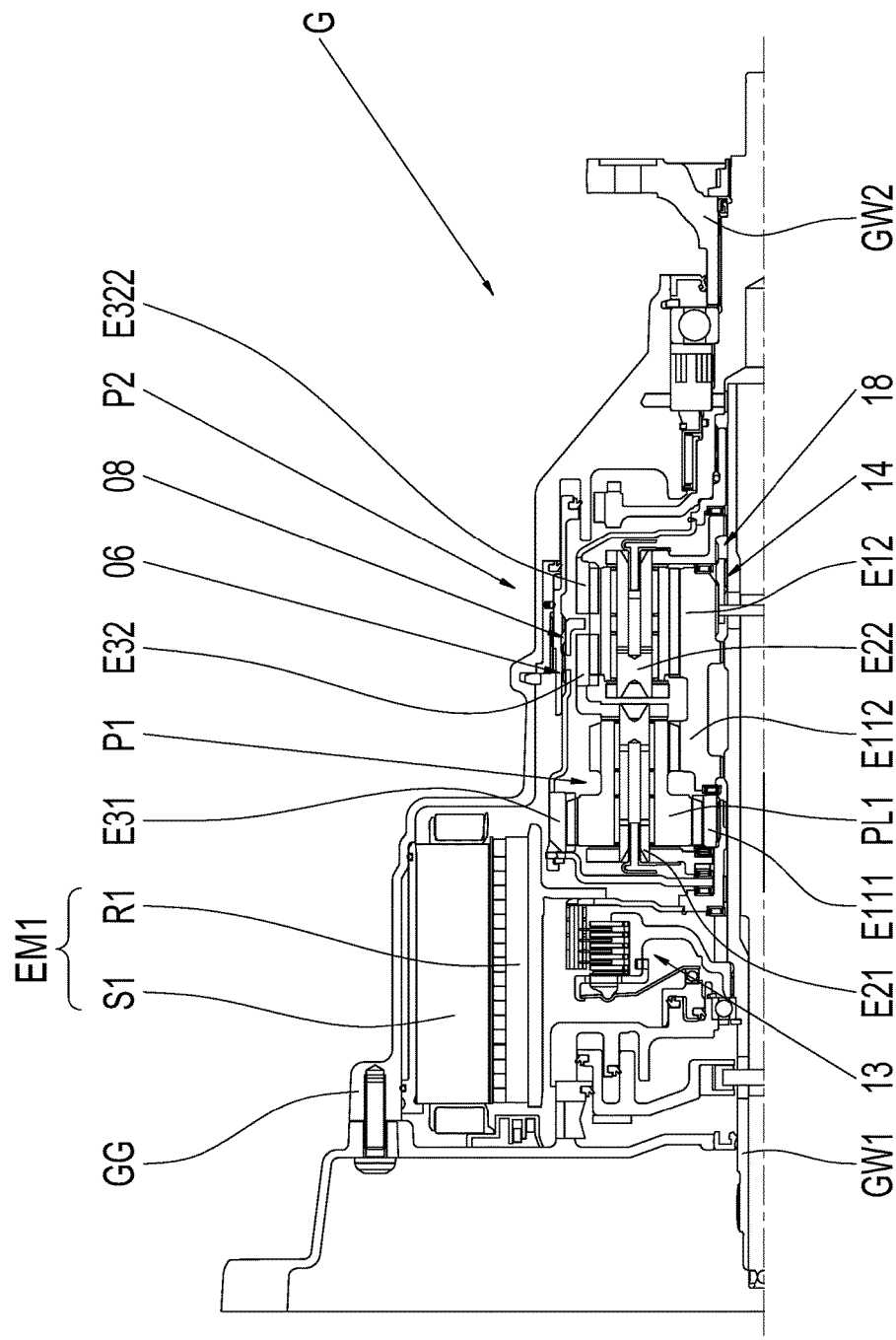
FIG. 6 is a sectional view of the transmission according to the third exemplary embodiment.

FIG. 6 shows a sectional view of the transmission G according to the second exemplary embodiment, but without the second electric machine EM2. Owing to the connection between the second ring gear E322 of the second planetary gear set P2 and the output shaft GW2, the fourth and sixth shift elements 06, 08 are, in the third exemplary embodiment, arranged radially between the second planetary gear set P2 and the housing GG.

Figure 7:
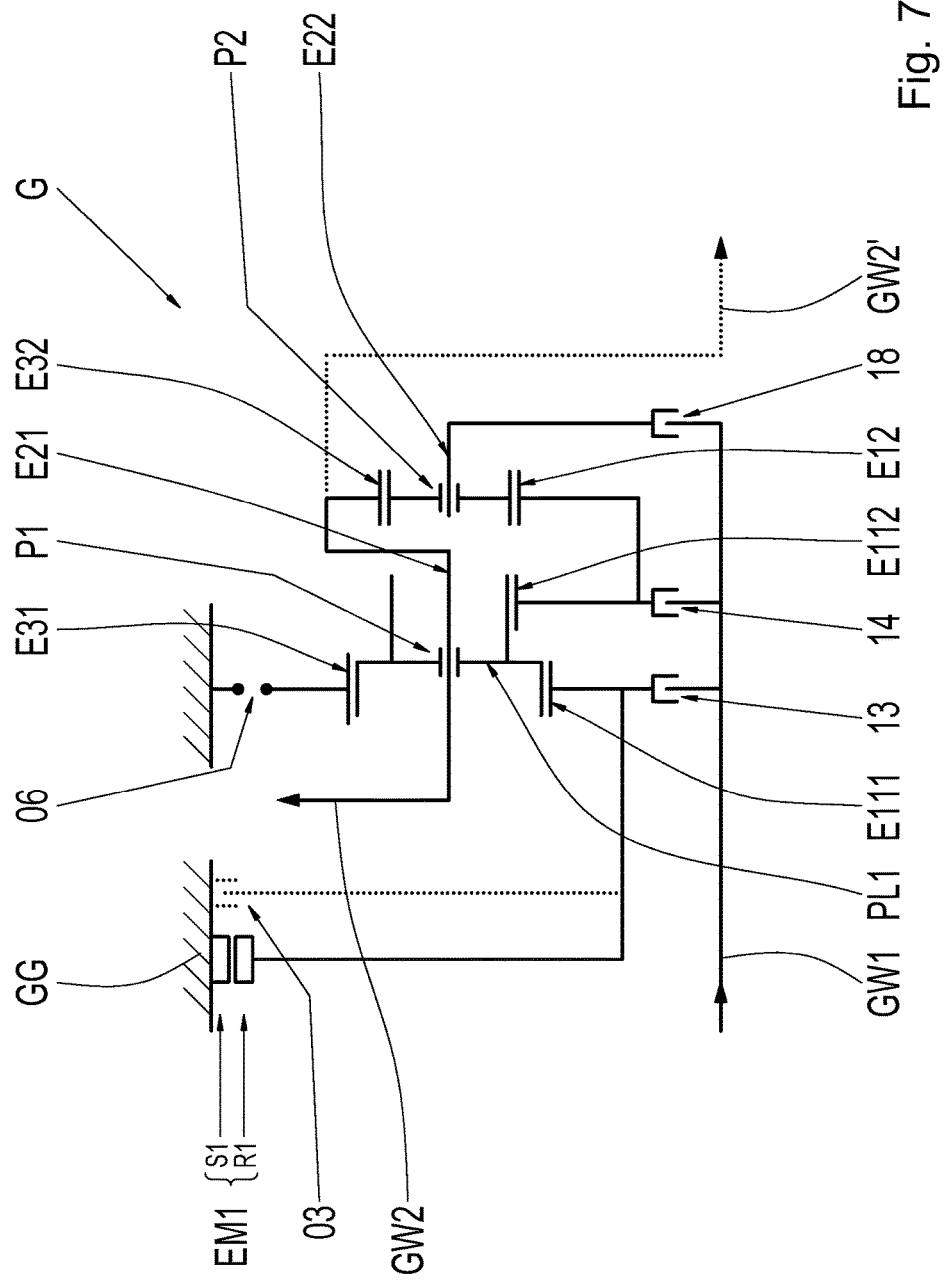
FIG. 7 is a schematic view of a transmission according to a fourth exemplary embodiment of the invention.

FIG. 7 schematically shows a transmission G according to a fourth exemplary embodiment of the invention. By contrast to the first exemplary embodiment shown in FIG. 1, the first and second shift elements 18, 14 are in the form of frictionally engaging shift elements, in particular in the form of multiplate clutches, in the transmission G according to the fourth exemplary embodiment. The fifth shift element 03 is optional.

Figure 8:
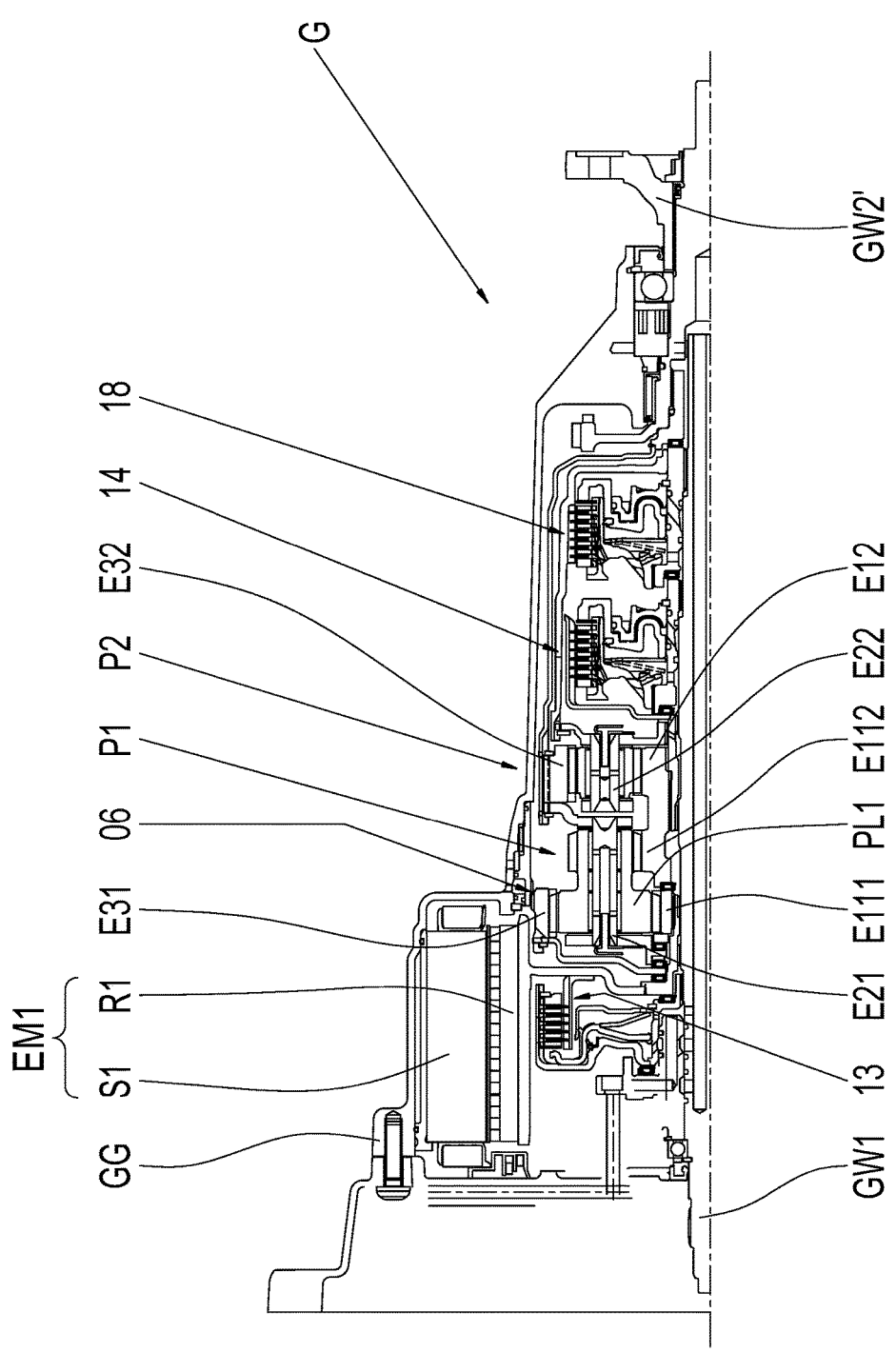
FIG. 8 is a sectional view of the transmission according to the fourth exemplary embodiment.

FIG. 8 shows a sectional view of the transmission G according to the fourth exemplary embodiment, without the fifth shift element 03, and with a coaxial arrangement of the input shaft GW1 and output shaft GW2' at axially opposite ends of the transmission G. The embodiment of the first and second shift elements 18, 14 as frictionally engaging shift elements can be clearly seen. The fourth shift element 06 is arranged radially between the ring gear E31 of the first planetary gear set P1 and the housing GG.

Figure 9:
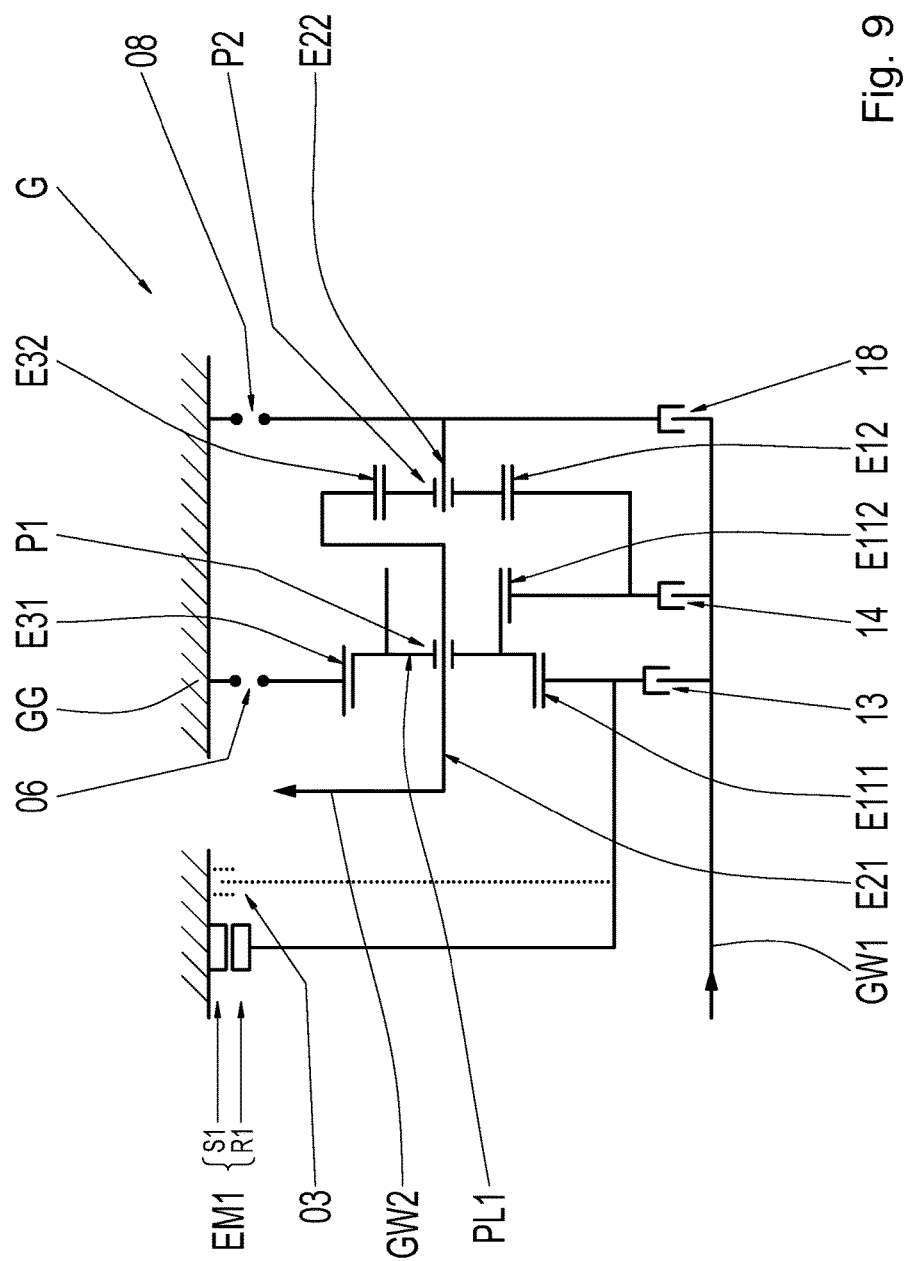
FIG. 9 is a schematic view of a transmission according to a fifth exemplary embodiment of the invention.

FIG. 9 schematically shows a transmission G according to a fifth exemplary embodiment of the invention, which is of analogous construction to the second exemplary embodiment shown in FIG. 3 with the difference that, in the fifth exemplary embodiment, the first and second shift elements 14, 18 are in the form of frictionally engaging shift elements. The fifth shift element 03 is provided optionally.

Figure 10:
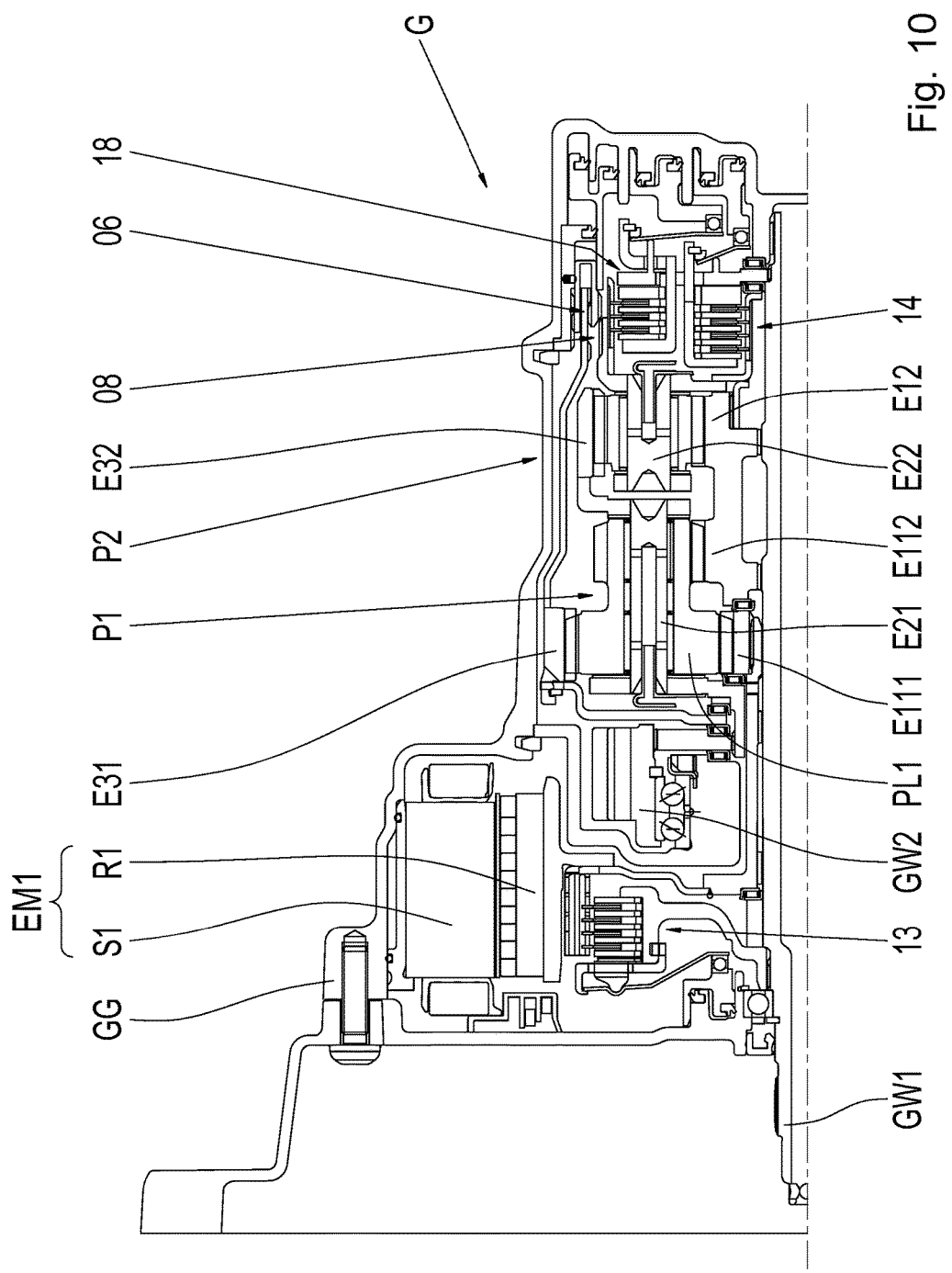
FIG. 10 is a sectional view of the transmission according to the fifth exemplary embodiment.

FIG. 10 shows a sectional view of the transmission G according to the fifth exemplary embodiment, without the fifth shift element 03. The first and second shift elements 18, 14 are arranged at that axial end of the transmission G which is situated opposite the input side of the transmission G. The first shift element 18 is arranged radially outside the second shift element 14 in order to reduce the axial overall length of the transmission G. The fourth and sixth shift elements 06, 08 are arranged radially between the first shift element 18 and the housing GG.

Figure 11:
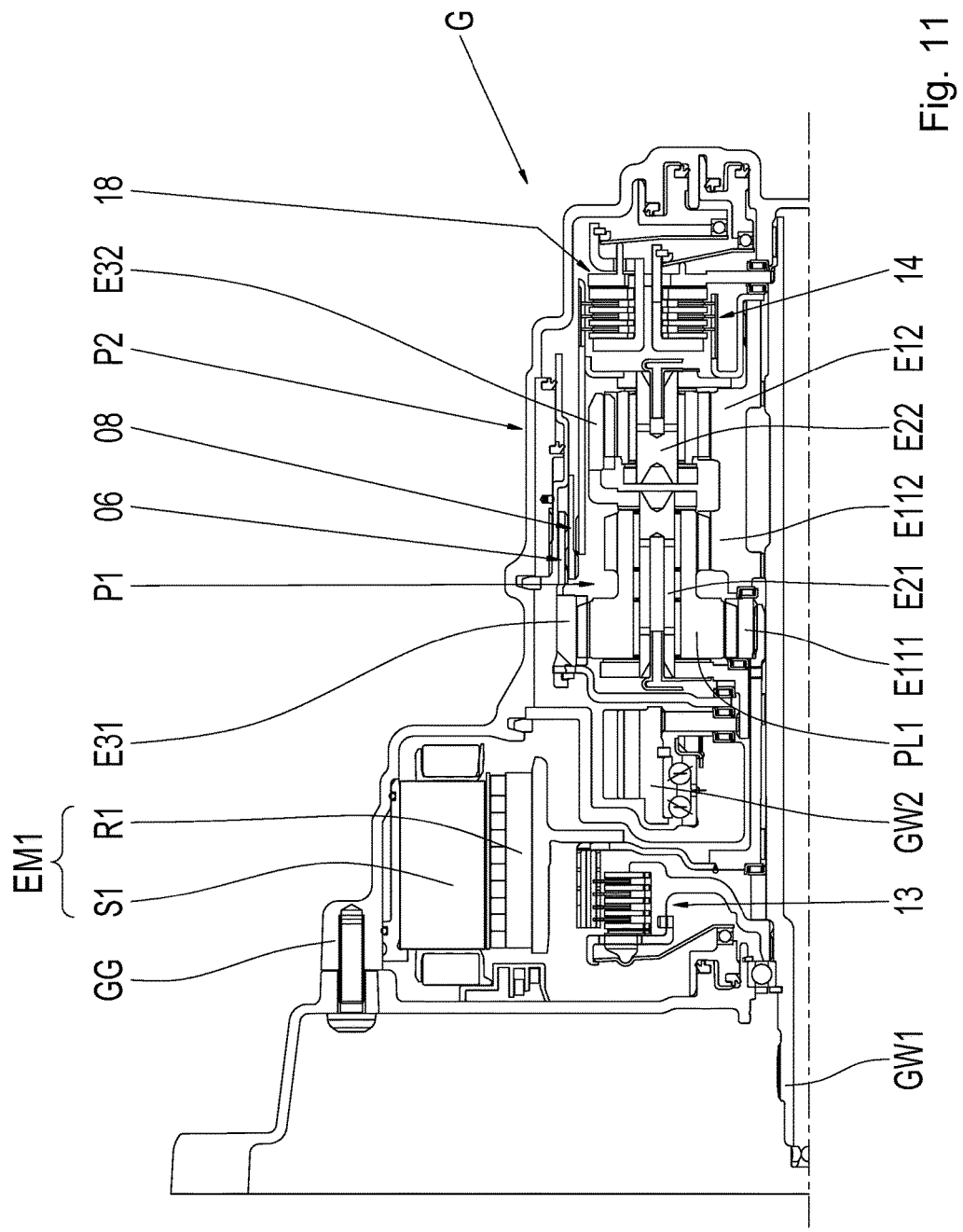
FIG. 11 is a sectional view of the transmission according to the fifth exemplary embodiment with a changed shift element arrangement.
Figure 12:
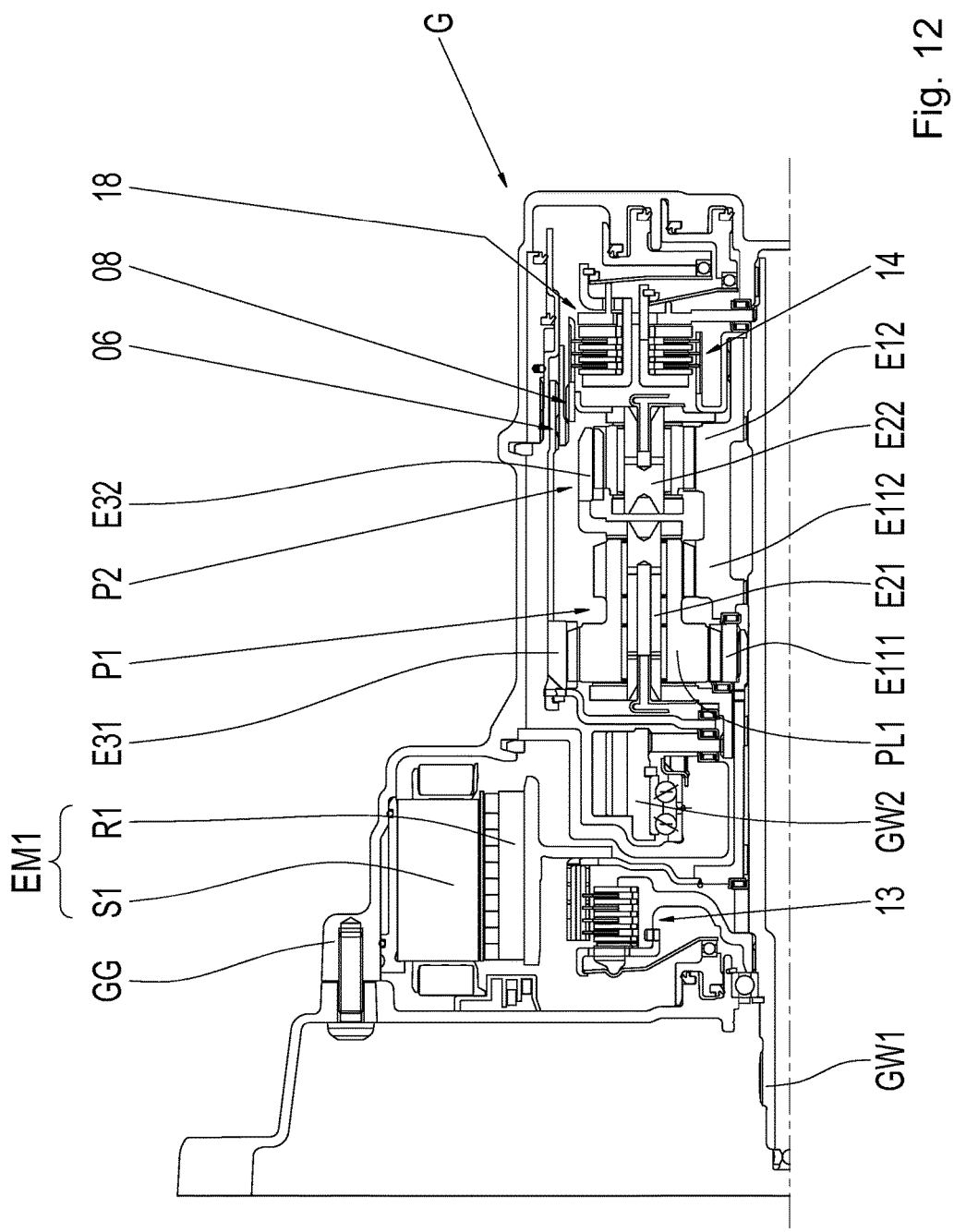
FIG. 12 is a sectional view of the transmission according to the fifth exemplary embodiment with a changed shift element arrangement.

FIG. 11 shows a sectional view of the transmission G according to the fifth exemplary embodiment with an alternative refinement of the fourth and sixth shift elements 06, 08. The fourth and sixth shift elements 06, 08 are now arranged radially between the smaller effective diameter of the planet gears PL1 of the first planetary gear set P1 and the housing GG. This alternative arrangement of the positively engaging shift elements is particularly advantageous for use in a front-transverse drivetrain of a motor vehicle, because, in the case of this drivetrain architecture, the axial installation space between the longitudinal members of the vehicle front-end structure is greatly limited. A slim design must be provided in particular at that axial end which is averted from the input side of the transmission G. Owing to the relocation of the positively engaging shift elements 06, 08 toward the first planetary gear set P1, the installation space requirement at this position of the transmission G can be reduced. FIG. 12 shows a sectional view of the transmission G according to the fifth exemplary embodiment with a further alternative refinement of the fourth and sixth shift elements 06, 08.

FIG. 13 shows exemplary detail views of the fourth and sixth shift elements 06, 08 in the embodiment as per FIG. 10. Two elements SM1, SM2 are fixedly connected to one another, wherein the first element SM1 serves as a hydraulic piston. A charging of the piston with pressure leads to an axial displacement of the elements SM1, SM2. The second element SM2 has a U-shaped cross section with two axially extending legs, wherein dog toothings are formed on or fixed to the outer sides of the legs and the inner side of the radially inner leg. An axially fixed connecting shaft W6 which is connected to the ring gear E31 of the first planetary gear set P1 has two dog toothings on an inner diameter which are axially separated from each other. An axially fixed connecting shaft W8 which is connected to the carrier E22 of the second planetary gear set P2 has a dog toothing on an outer diameter. An insert is fixed to the housing GG, which insert has, on an inner diameter, a dog toothing and an axially spring-loaded ball which serves for the detent locking of the second element SM2. As an alternative to the hydraulic actuation, it would also be possible for the first element SM1 to be formed as a projection or as a constituent part of an electromechanical actuation means.

FIG. 13a shows an axial position of the elements SM1, SM2 in which the dog toothing formed on the housing insert engages with the dog toothing formed or fixed on the outer side of the radially outer leg of the second element SM2. The elements SM1, SM2 are thus rotationally fixed. At the same time, one of the dog toothings, which is formed on the connecting shaft W6 which is connected to the internal gear E31 of the first planetary gear set P1, engages with that dog toothing which is formed or fixed on the inner side of the leg of the second element SM2. In the axial position of the elements SM1, SM2 shown in FIG. 13a, it is thus the case that the fourth shift element 06 is closed, whereby the ring gear E31 of the first planetary gear set P1 is rotationally fixed.

FIG. 13b shows an axial position of the elements SM1, SM2 in which the dog toothing formed on the housing insert is still engaged with the dog toothing formed or fixed on the outer side of the radially outer leg of the second element SM2. The elements SM1, SM2 are thus rotationally conjointly immobilized. The dog toothing formed or fixed on the inner side of the leg of the second element SM2 now no longer engages with the dog toothings formed on the connecting shaft W6. Instead, the dog toothing formed or fixed on the outer side of the radially inner leg of the second element SM2 engages with the dog toothing formed on the connecting shaft W8 which is connected to the carrier E22 of the second planetary gear set P2. In the axial position of the elements SM1, SM2 shown in FIG. 13b, it is thus the case that the sixth shift element 08 is closed, whereby the carrier E22 of the second planetary gear set P2 is rotationally fixed.

Figure 13C:
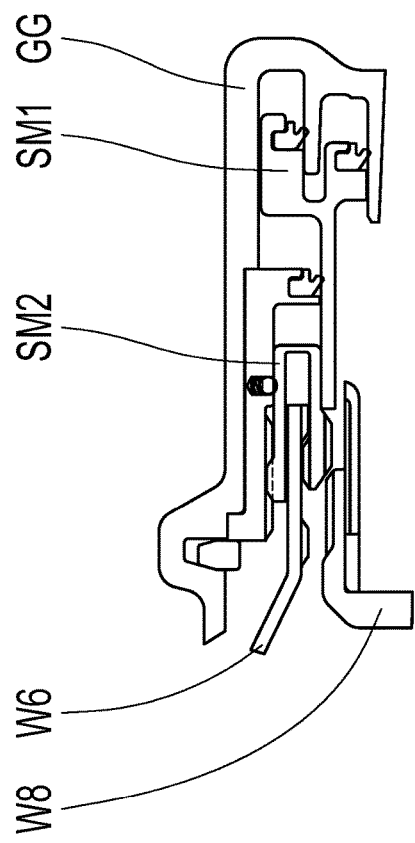

FIG. 13c shows an axial position of the elements SM1, SM2 in which, again, the dog toothing formed on the housing insert engages with the dog toothing formed or fixed on the outer side of the radially outer leg of the second element SM2. The elements SM1, SM2 are thus rotationally fixed. However, all further dog toothings are not engaged in the axial position of the elements SM1, SM2 shown in FIG. 13c, it is thus the case that none of the shift elements 06, 08 are closed.

Figure 13D:
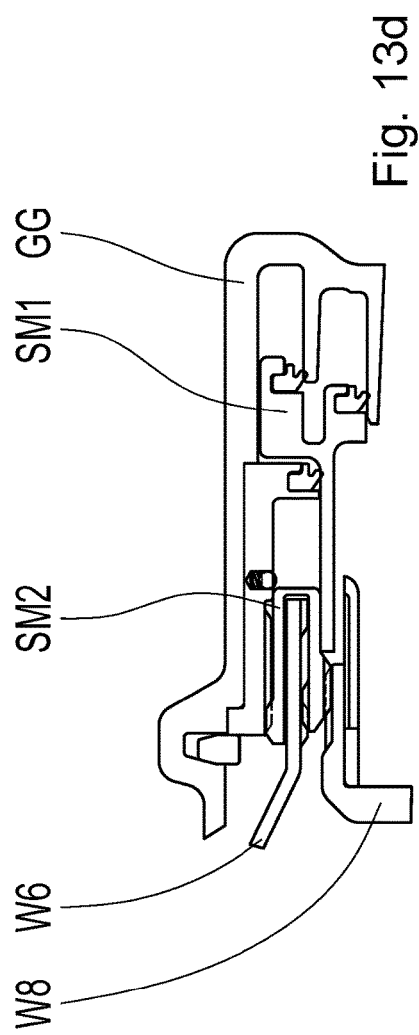

FIG. 13d shows an axial position of the elements SM1, SM2 in which, again, the dog toothing formed on the housing insert engages with the dog toothing formed or fixed on the outer side of the radially outer leg of the second element SM2. In the illustrated axial position of the elements SM1, SM2, both the connecting shaft W6 and the connecting shaft W8 are rotationally fixed by the dog toothings. In this way, both the ring gear E31 of the first planetary gear set P1 and the carrier E22 of the second planetary gear set P2 are rotationally fixed. The twofold coupling of the two planetary gear sets P1, P2 results in blocking of the gear set. In this position, the second element SM2 has been deployed outward to such an extent that the spring-loaded ball prevents the second element SM2 from moving back on its own accord. In this way, it is possible in a simple manner, using existing components, to realize a parking lock P of the transmission.

Figure 14:
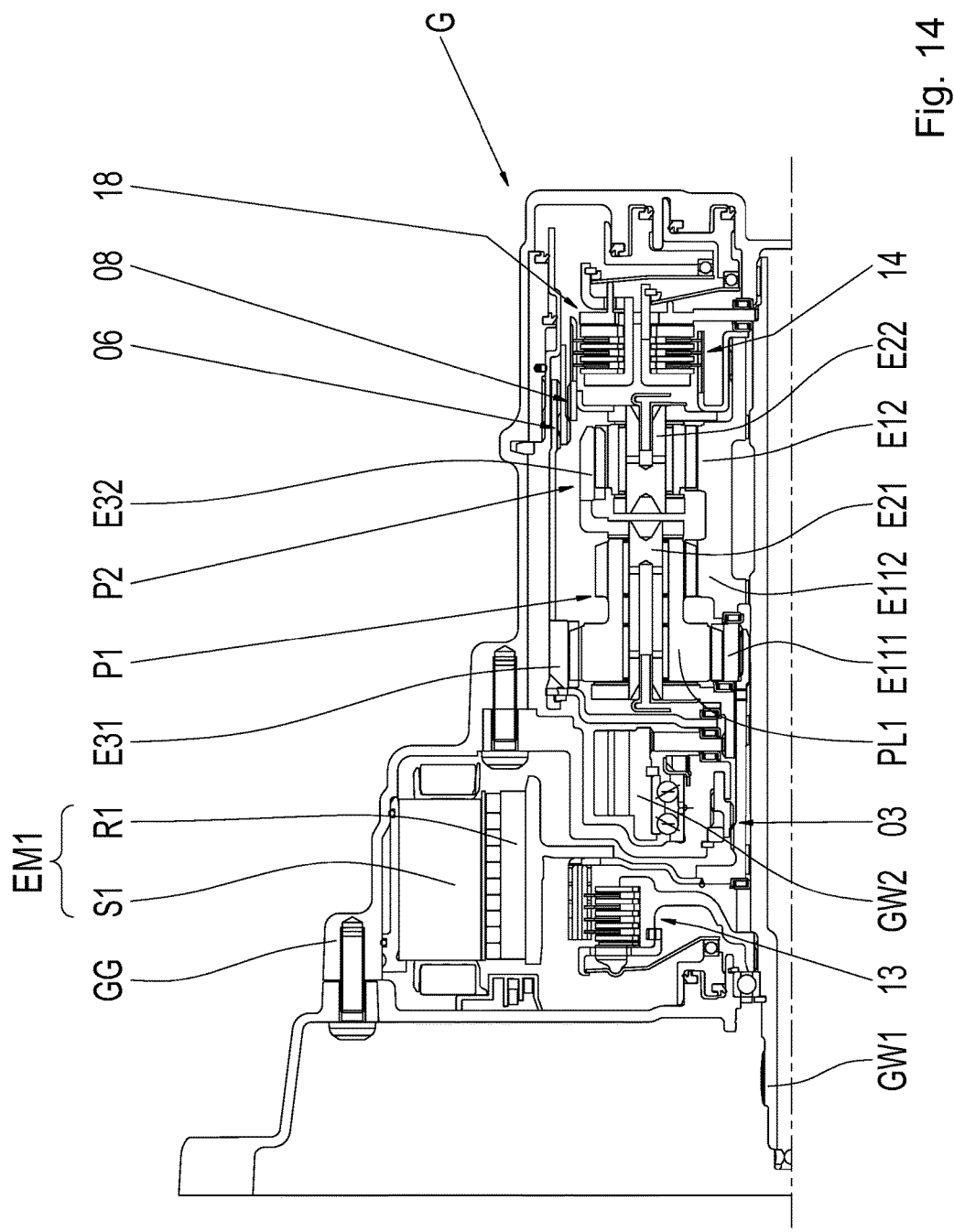
FIG. 14 is a sectional view of the transmission according to the fifth exemplary embodiment with a fifth shift element as a dog-clutch shift element.

FIG. 14 shows a sectional view of the transmission G according to the fifth exemplary embodiment, wherein the transmission G has the fifth shift element 03, in the form of a positively engaging dog-clutch shift element. The fifth shift element 03 is in this case arranged radially within the rolling bearing arrangement of the output shaft toothing.

Figure 15:
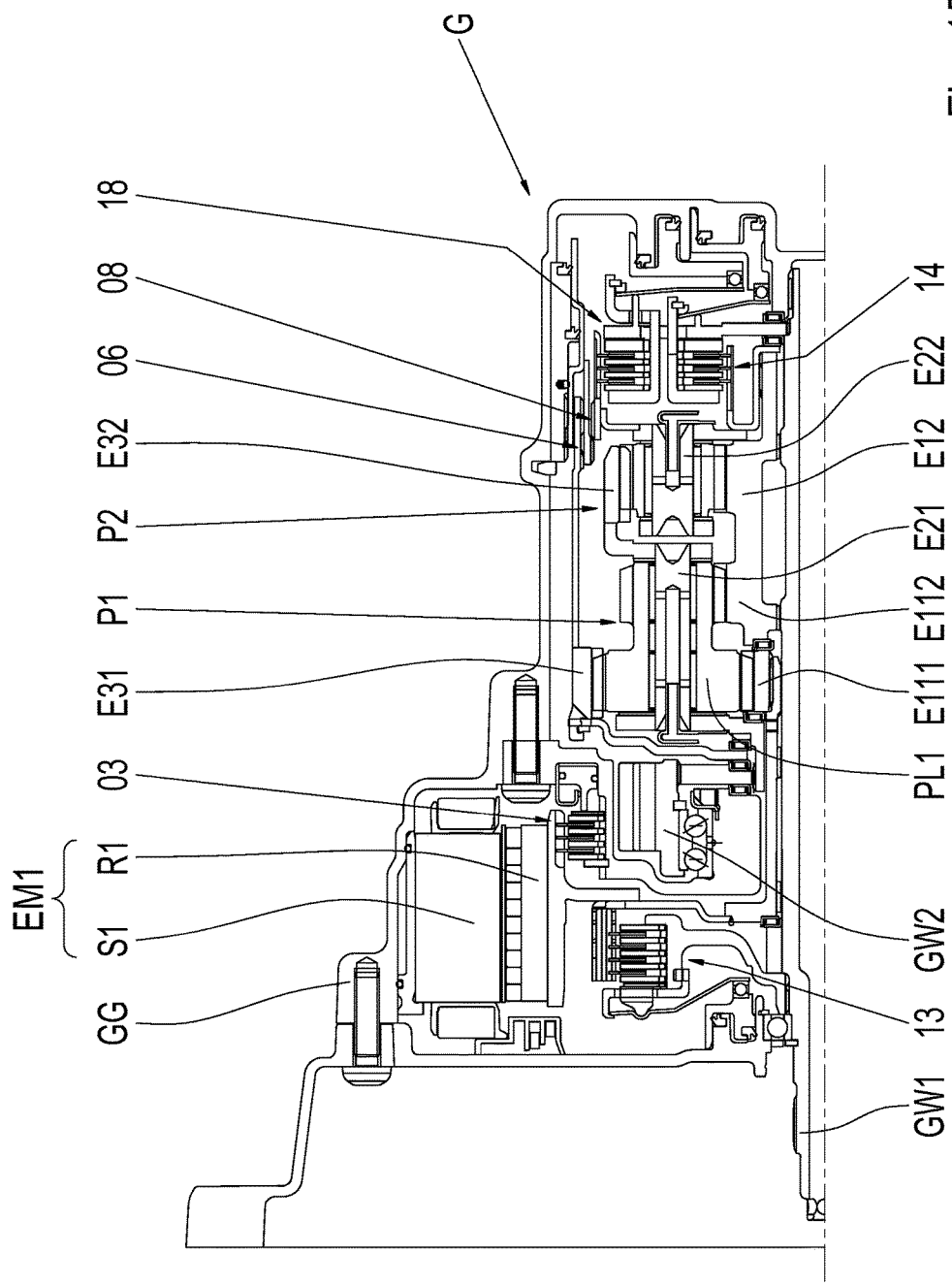
FIG. 15 is a sectional view of the transmission according to the fifth exemplary embodiment with a fifth shift element as a multiplate brake.

FIG. 15 shows a sectional view of the transmission G according to the fifth exemplary embodiment, wherein the transmission G has the fifth shift element 03, in the form of a hydraulically actuated multiplate brake. Here, the fifth shift element 03 is arranged radially within the rotor R1 of the first electric machine EM1, close to the output shaft toothing. As a result of the fifth shift element 03 being in the form of a frictionally engaging shift element, shift processes without an interruption in traction force into those forward gear ratios in which the fifth shift element 03 has to be closed are possible even if the first electric machine EM1 is not available for example owing to an inverter defect.

Figure 16:
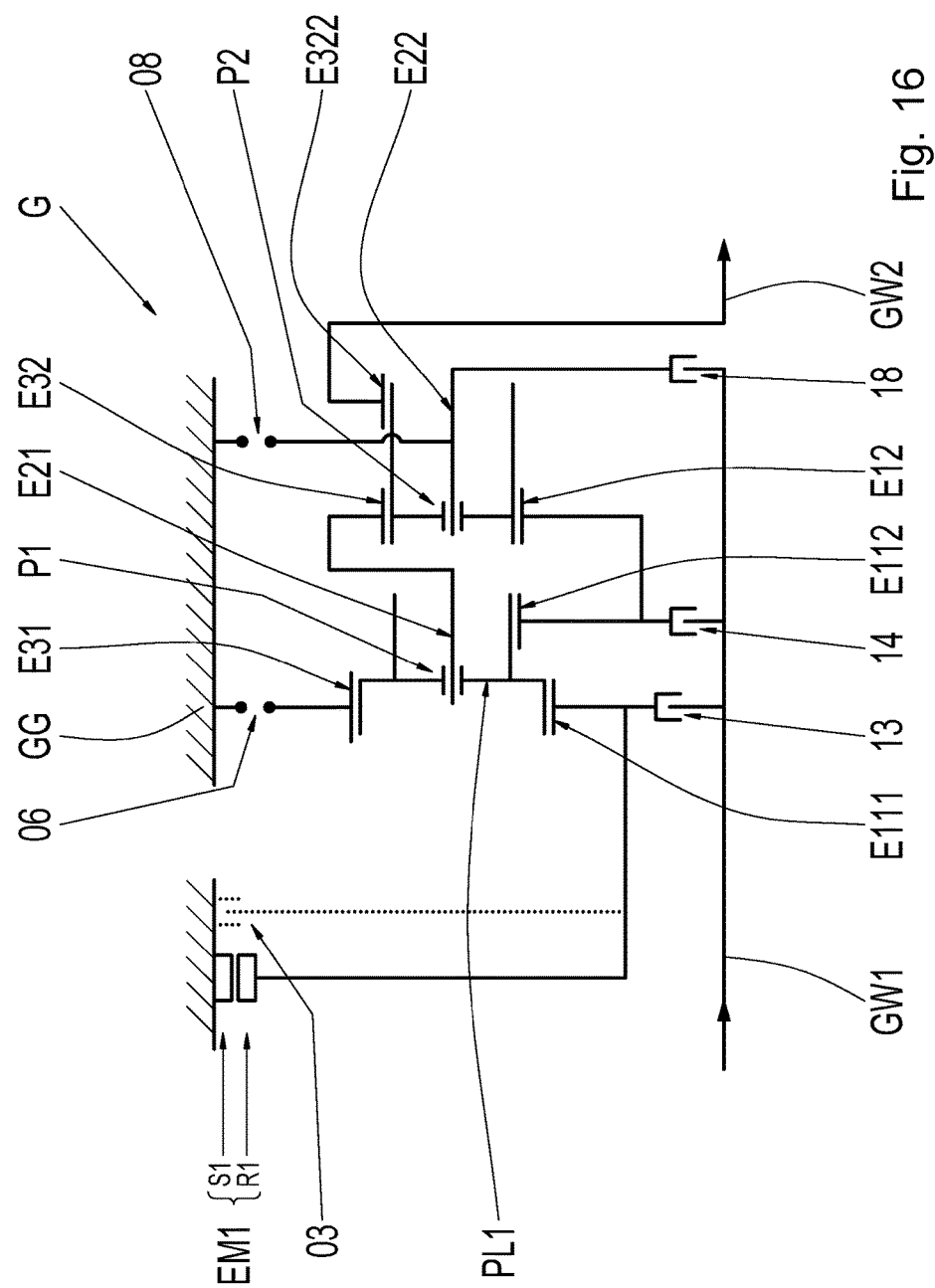
FIG. 16 is a schematic view of a transmission according to a sixth exemplary embodiment of the invention.

FIG. 16 schematically shows a transmission G according to a sixth exemplary embodiment of the invention, which is of similar construction to the third exemplary embodiment shown in FIG. 5, with the difference that, in the sixth exemplary embodiment, the first and second shift elements 14, 18 are in the form of frictionally engaging shift elements. The fifth shift element 03 is optionally provided.

Figure 17:
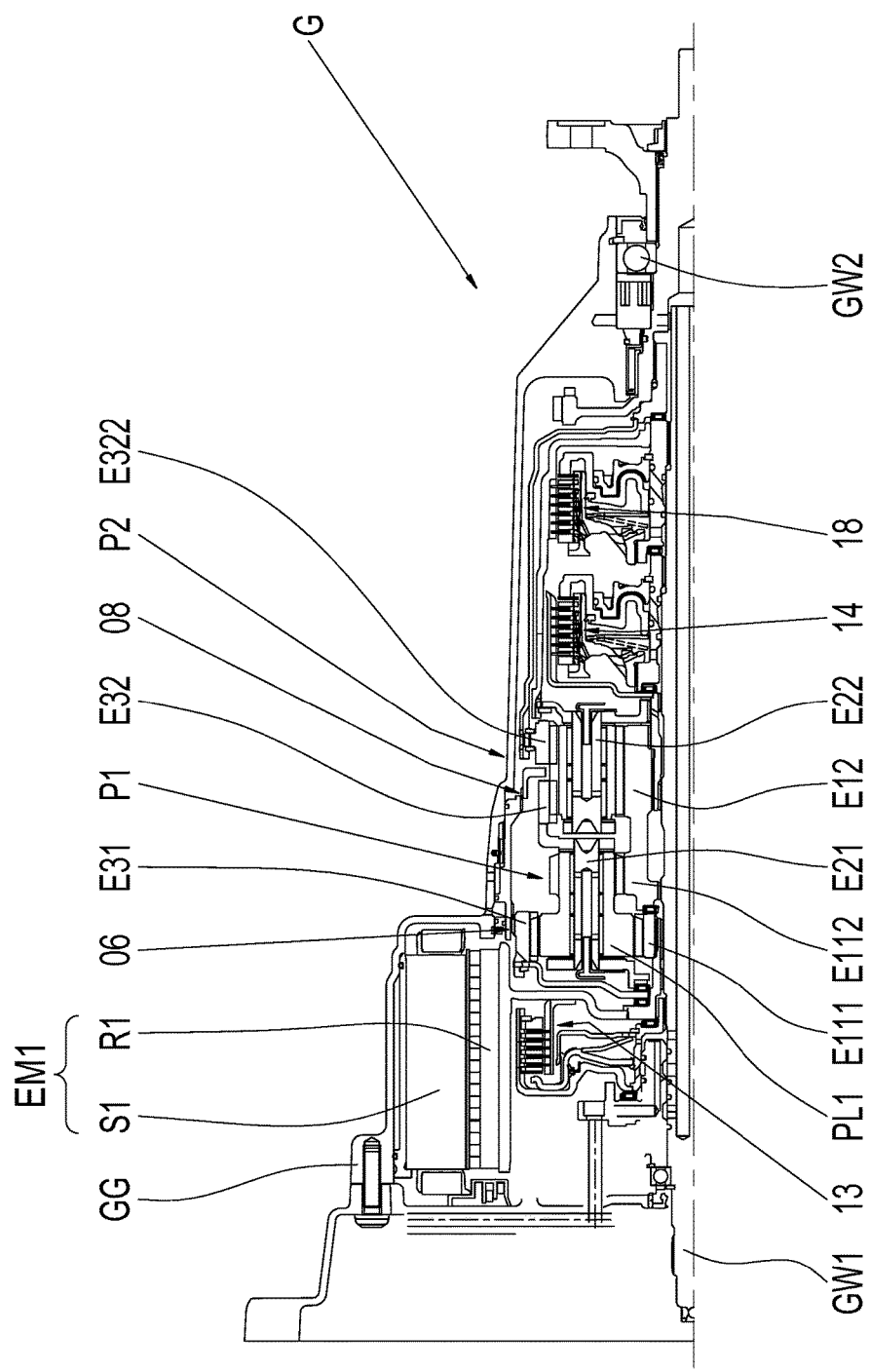
FIG. 17 is a sectional view of the transmission according to the sixth exemplary embodiment.

FIG. 17 shows a sectional view of the transmission G according to the sixth exemplary embodiment, without the fifth shift element 03. The fourth and sixth shift elements 06, 08, which are in the form of positively engaging shift elements, are arranged radially between the two planetary gear sets P1, P2 and the housing GG. In the embodiment shown in FIG. 17, it can be seen particularly clearly that the transmission G, in a front-longitudinal design, is of particularly slim construction. Owing to the small installation space requirement of the transmission G, the central tunnel of the vehicle can be kept small, whereby the space availability in the interior of the motor vehicle is improved.

Figure 18:
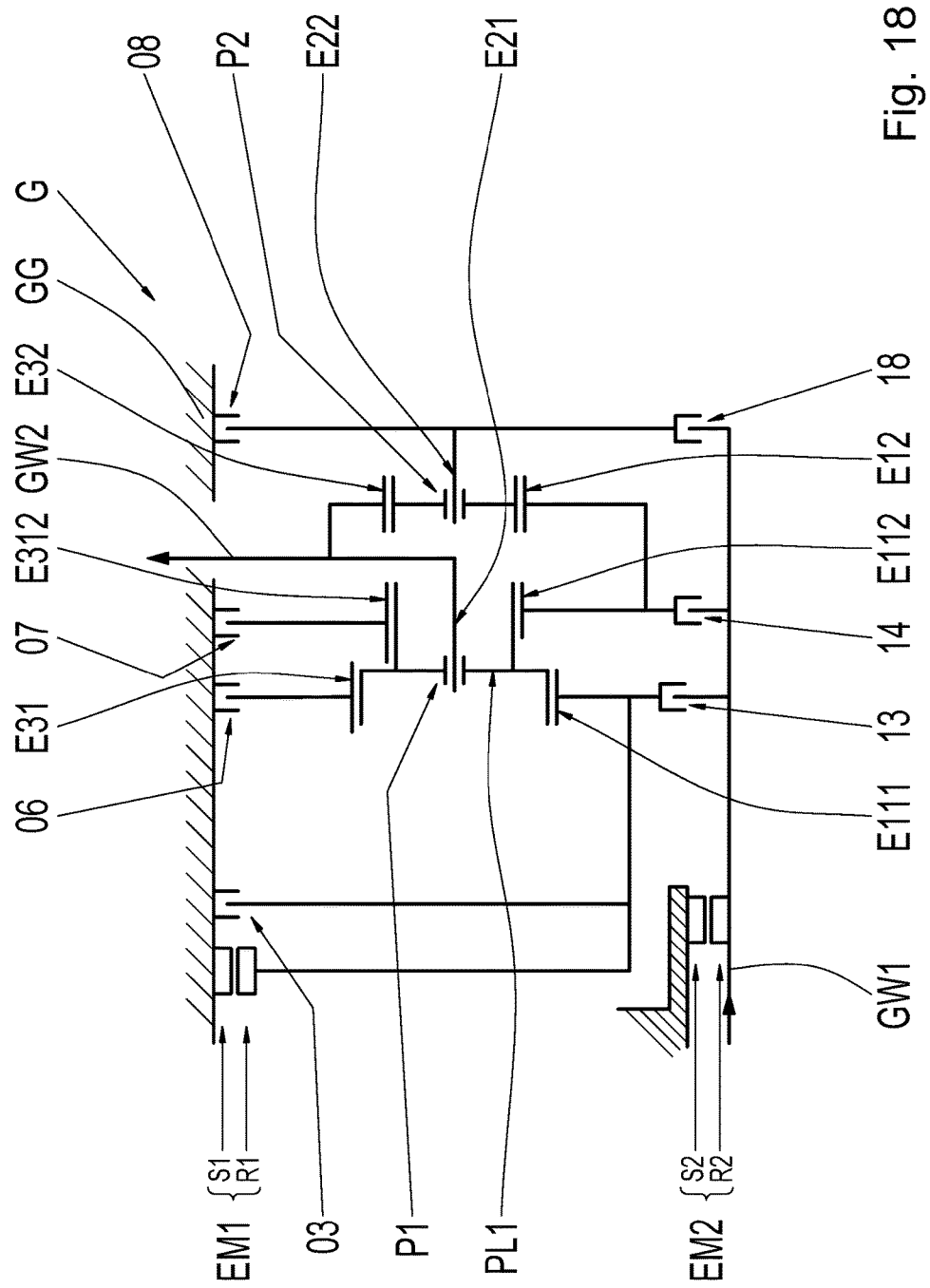
FIG. 18 is a schematic view of a transmission according to a seventh exemplary embodiment of the invention.

FIG. 18 schematically shows a transmission G according to a seventh exemplary embodiment of the invention. In said seventh exemplary embodiment, the first planetary gear set P1 has a second ring gear E312, which engages with the smaller effective diameter of the planet gears PL1. The second ring gear E312 is capable of being rotationally fixed by connecting said second ring gear E312 by the seventh shift element 07 in a shiftable manner to the housing GG. Said additional ring gear E312 and the seventh shift element 07 may be optionally added to any transmission G in this subject matter. The seventh shift element 07 may be in the form of a frictionally engaging shift element or in the form of a positively engaging shift element.

FIGS. 19a-19d and 20a-20d show engagement sequence tables for the transmissions G of the first to seventh exemplary embodiments. In said diagrams, a column is provided in which the function of the first electric machine EM1 is illustrated. Here, the sign '+' is used to denote when the first electric machine EM1 is operated at a motor operating point. The sign '−' is used to denote operation of the first electric machine EM1 at a generator operating point. The sign 'x' is used to denote supporting operation of the first electric machine EM1, in the case of which it is the intention that the rotor R1 assumes a rotational speed of zero or a low rotational speed. The sign '+/−' is used to denote operation of the first electric machine EM1 in the case of which a generator operating point or a motor operating point is selected in accordance with the demand. The sign 'o' is used to denote optional operation of the first electric machine EM1, with both motor and generator operating points being possible. Where the column relating to the function of the first electric machine EM1 has no entry, the first electric machine EM1 is inactive.

FIG. 19a shows an engagement sequence table for a transmission G according to the first exemplary embodiment, without the fifth shift element 03. In the rows of the engagement sequence table there are listed five forward gear ratios G1 to G5, two electrodynamic operating modes EDA1, EDA2, and a first electric operating mode E1. In the columns of the engagement sequence table, the sign 'x' is used to denote which of the shift elements 06, 13, 14, 18 are closed in the respective forward gear ratio G1 to G5 or operating mode EDA1, EDA2, E1. Here, optional operation of the first electric machine EM1 is possible in the first to fourth forward gear ratios G1-G4. If the transmission G is being used in the drivetrain of a motor vehicle, the first electric machine EM1 can thus both output and receive, or, more specifically, recuperate, power in the first to fourth forward gear ratios G1-G4. The first electric machine EM1 is also capable of supporting all shift processes between the first and fifth forward gear ratios G1-G5 by placing the positively engaging shift element which is to be opened into a load-free state prior to the opening process. Subsequently, the first electric machine EM1 can, while maintaining the load, set the target rotational speed required for the closure of the positively engaging shift element which is to be closed.

The first forward gear ratio G1 is realized by closing the fourth shift element 06 and the third shift element 13. The second forward gear ratio G2 is realized by closing the fourth shift element 06 and the second shift element 14. The third forward gear ratio G3 is realized by closing the fourth shift element 06 and the first shift element 18. The fourth forward gear ratio G4 is realized by closing the first shift element 18 and optionally the third shift element 13 or the second shift element 14. The fifth forward gear ratio G5 is realized by closing the first shift element 18 and by supporting the first sun gear E111 of the first planetary gear set P1 by the first electric machine EM1. The supporting load required for this purpose is relatively low, such that the energy demand required for this purpose is likewise low. Here, the electric machine EM1 is preferably regulated such that the rotor R1 has a low rotational speed. This changes the transmission ratio between the input shaft GW1 and output shaft GW2 only slightly, but simplifies the regulation of the first electric machine EM1.

In a first electrodynamic operating mode EDA1, the second shift element 14 is closed and all further shift elements are open. In this way, the torque acting at the output shaft GW2 is continuously variable through variation of the torque acting at the input shaft GW1 and of the torque acting at the rotor R1 of the first electric machine EM1. In a second electrodynamic operating mode EDA2, the first shift element 18 is closed, and all further shift elements are open. In this way, the torque acting at the output shaft GW2 is continuously variable through variation of the torque acting at the input shaft GW1 and of the torque acting at the rotor R1 of the first electric machine EM1. In the first electrodynamic operating mode EDA1, the first electric machine EM1 is operated as a generator. In the second electrodynamic operating mode EDA2, the first electric machine EM1 is operated as a motor. In the first electric operating mode E1, the fourth shift element 06 is closed and all further shift elements are open. In this way, the torque acting at the output shaft GW2 is continuously variable through variation of the torque acting at the rotor R1 of the first electric machine EM1. In the first electric operating mode E1, the input shaft GW1 and all elements connected thereto are decoupled from the output.

FIG. 19b shows an engagement sequence table for a transmission G according to the first exemplary embodiment, which includes the fifth shift element 03. The fifth forward gear ratio G5 is in this case formed by closing the fifth shift element 03 and the first shift element 18. Here, the first electric machine EM1 is rotationally fixed, and is thus inactive.

FIG. 19c shows an engagement sequence table for a transmission G according to the second or third exemplary embodiment, which includes the sixth shift element 08. The fifth shift element 03 is not included in the shown engagement sequence table, but could be integrated in the same way as shown in FIG. 19b. By contrast to the engagement sequence tables of the first exemplary embodiment, the transmission G now has at least one mechanical first reverse gear ratio GR, which is formed by closing the third shift element 13 and the sixth shift element 08. A second reverse gear ratio GR2 is formed by closing the sixth shift element 08 and the second shift element 14. In both reverse gear ratios GR, GR2, the first electric machine EM1 can both output and receive power. In all forward gear ratios G1-G5 and in the electrodynamic operating modes EDA1, EDA2 and in the first electric operating mode E1, the sixth shift element 08 is open. By introducing the sixth shift element 08, a second electric operating mode E2 is made possible, in which only the sixth shift element 08 is closed and all further shift elements are open. In this way, the torque acting at the output shaft GW2 is continuously variable through variation of the torque acting at the rotor R1 of the first electric machine EM1. If both the fourth shift element 06 and the sixth shift element 08 are closed, then the gear set of the transmission G is blocked, whereby a parking lock P is formed.

FIG. 19*d* shows an engagement sequence table for a transmission G according to the seventh exemplary embodiment, which includes the seventh shift element 07. Here, the first, second, fourth, sixth and seventh shift elements 18, 14, 06, 08, 07 are in the form of positively engaging shift elements. The fifth shift element 03 is not included in the shown engagement sequence table, but could be integrated in the same way as shown in FIG. 19*b*. By closing the seventh shift element 07 and the third shift element 13, a seventh forward gear ratio G7 is formed, which has a particularly short transmission ratio. The seventh forward gear ratio G7 must therefore be ranked before even the first forward gear ratio G1 in the transmission ratio sequence of the transmission G. The seventh forward gear ratio G7 thus forms a crawling gear, and serves for example for increasing the hill-climbing capability of the motor vehicle which is equipped with the transmission G according to the seventh exemplary embodiment.

FIG. 20*a* shows an engagement sequence table for the transmission G according to the fourth exemplary embodiment, which does not include the fifth shift element 03. As a result of the first and second shift elements 18, 14 being in the form of frictionally engaging shift elements, an additional forward gear ratio, specifically a sixth forward gear ratio G6, can be selected. The sixth forward gear ratio G6 is formed by closing the second shift element 14 and supporting the first sun gear E111 of the first planetary gear set P1 by the first electric machine EM1. The supporting load required for this purpose is relatively low, such that the energy demand required for this purpose is likewise low. Here, the electric machine EM1 is preferably regulated such that the rotor R1 has a low rotational speed. This changes the transmission ratio between the input shaft GW1 and output shaft GW2 only slightly, but simplifies the regulation of the first electric machine EM1.

FIG. 20*b* shows an engagement sequence table for the transmission G according to the fourth exemplary embodiment which includes the fifth shift element 03. The sixth forward gear ratio G6 is in this case formed by closing the fifth shift element 03 and the second shift element 14. Here, the first electric machine EM1 is rotationally fixed and is thus inactive.

FIG. 20*c* shows an engagement sequence table for the transmissions G according to the fifth and sixth exemplary embodiments, without the fifth shift element 03. The shown engagement sequence table is identical to the engagement sequence table shown in FIG. 19*c*, aside from the sixth forward gear ratio G6.

FIG. 20*d* shows an engagement sequence table for a transmission G according to the seventh exemplary embodiment, which includes the seventh shift element 07. Here, the first and second shift elements 18, 14 are in the form of frictionally engaging shift elements. The shown engagement sequence table is identical to the engagement sequence table shown in FIG. 19*d*, aside from the sixth forward gear ratio G6.

Figure 21:
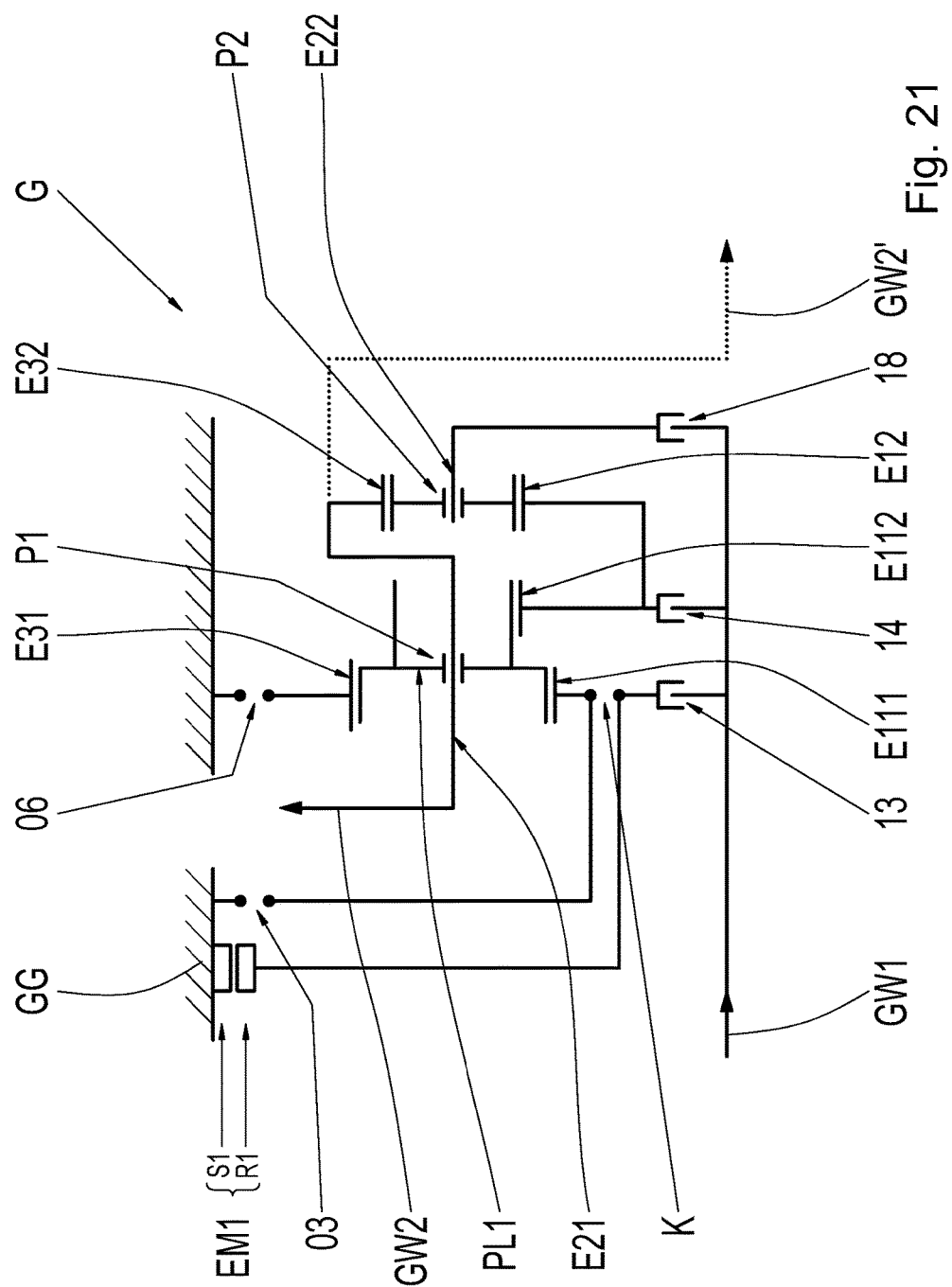
FIG. 21 is a schematic view of a transmission according to an eighth exemplary embodiment of the invention.

FIG. 21 schematically shows a transmission G according to an eighth exemplary embodiment of the invention. By contrast to the fourth exemplary embodiment shown in FIG. 7, the transmission G according to the eighth exemplary embodiment has an auxiliary shift element K which is arranged in the power flow between the third shift element 13 and the first sun gear E111 of the first planetary gear set P1. Accordingly, by closing the third shift element 13, a rotationally conjoint connection is produced between the input shaft GW1 and the rotor R1 of the first electric machine EM1. By closing the auxiliary shift element K, a rotationally conjoint connection is produced between the rotor R1 and the first sun gear E111 of the first planetary gear set P1. The transmission G according to the eighth exemplary embodiment imperatively has the fifth shift element 03. The auxiliary shift element K is in the form of a positively engaging shift element, in particular in the form of a dog clutch. The fifth shift element 03 is either in the form of a positively engaging shift element or in the form of a frictionally engaging shift element. This also applies to the first and second shift elements 18, 14.

Figure 22:
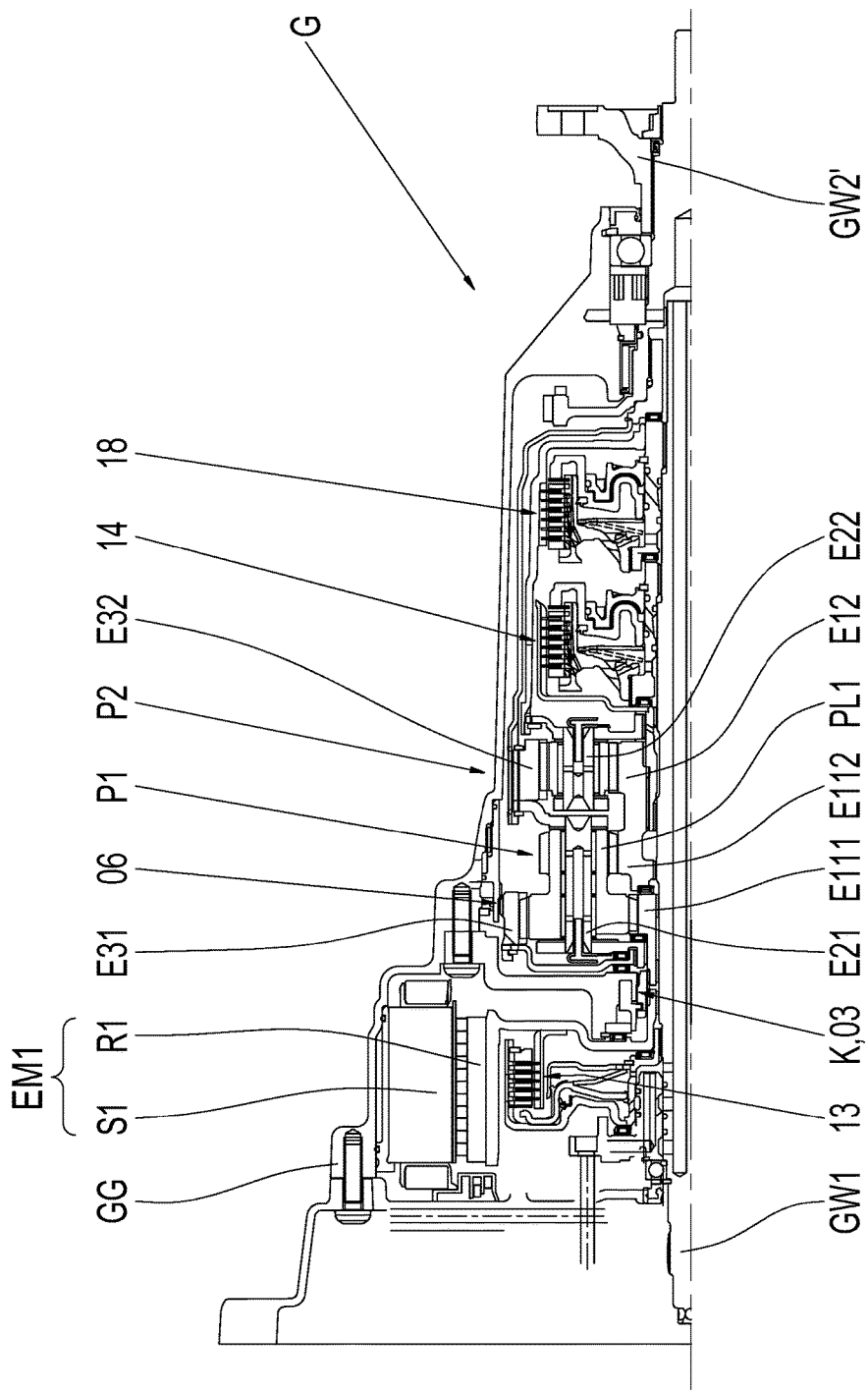
FIG. 22 is a sectional view of the transmission according to the eighth exemplary embodiment.

FIG. 22 shows a sectional view of the transmission G according to the eighth exemplary embodiment, with a coaxial arrangement of the input shaft GW1 and output shaft GW2' at axially opposite ends of the transmission G, the first and second shift elements 18, 14 being in the form of frictionally engaging multiplate clutches, and the fifth shift element 03 being in the form of a positively engaging dog clutch. The auxiliary shift element K and the fifth shift element 03 are in this case actuable by the same actuation element. Depending on the position of said actuation element, either the auxiliary shift element K or the fifth shift element 03 is closed. The auxiliary shift element K and the fifth shift element 03 are in this case arranged axially between the third shift element 13 and the first planetary gear set P1, radially close to the input shaft GW1.

Figure 23:
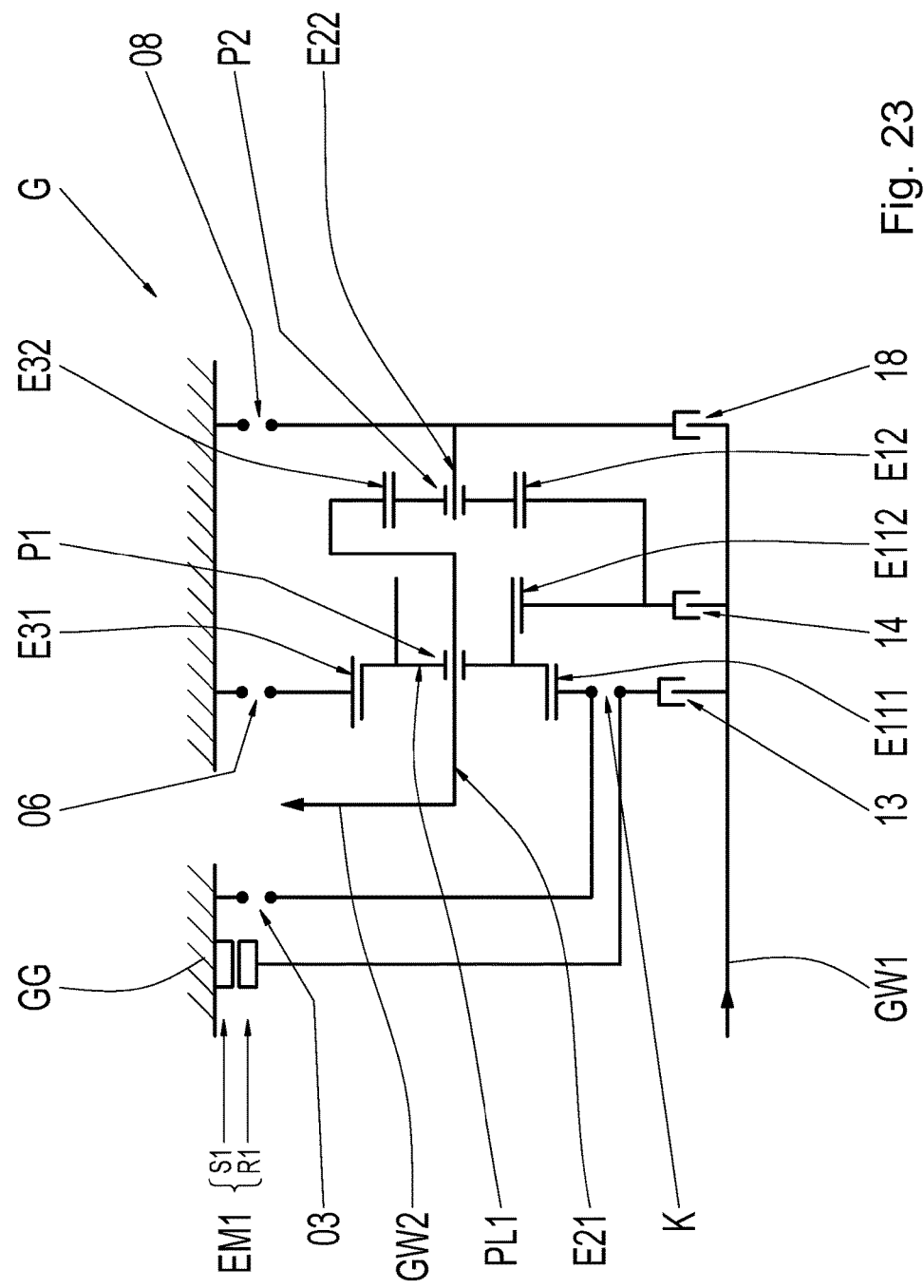
FIG. 23 is a schematic view of a transmission according to a ninth exemplary embodiment of the invention.

FIG. 23 schematically shows a transmission G according to a ninth exemplary embodiment of the invention. By contrast to the eighth exemplary embodiment shown in FIG. 21, the transmission G according to the ninth exemplary embodiment has the sixth shift element 08, whereby the formation of the mechanical reverse gear ratios GR, GR2 is possible. The first and second shift elements 18, 14 are in the form of frictionally engaging shift elements. As an alternative to this, the first and second shift elements 18, 14 may also be in the form of positively engaging shift elements.

Figure 24:
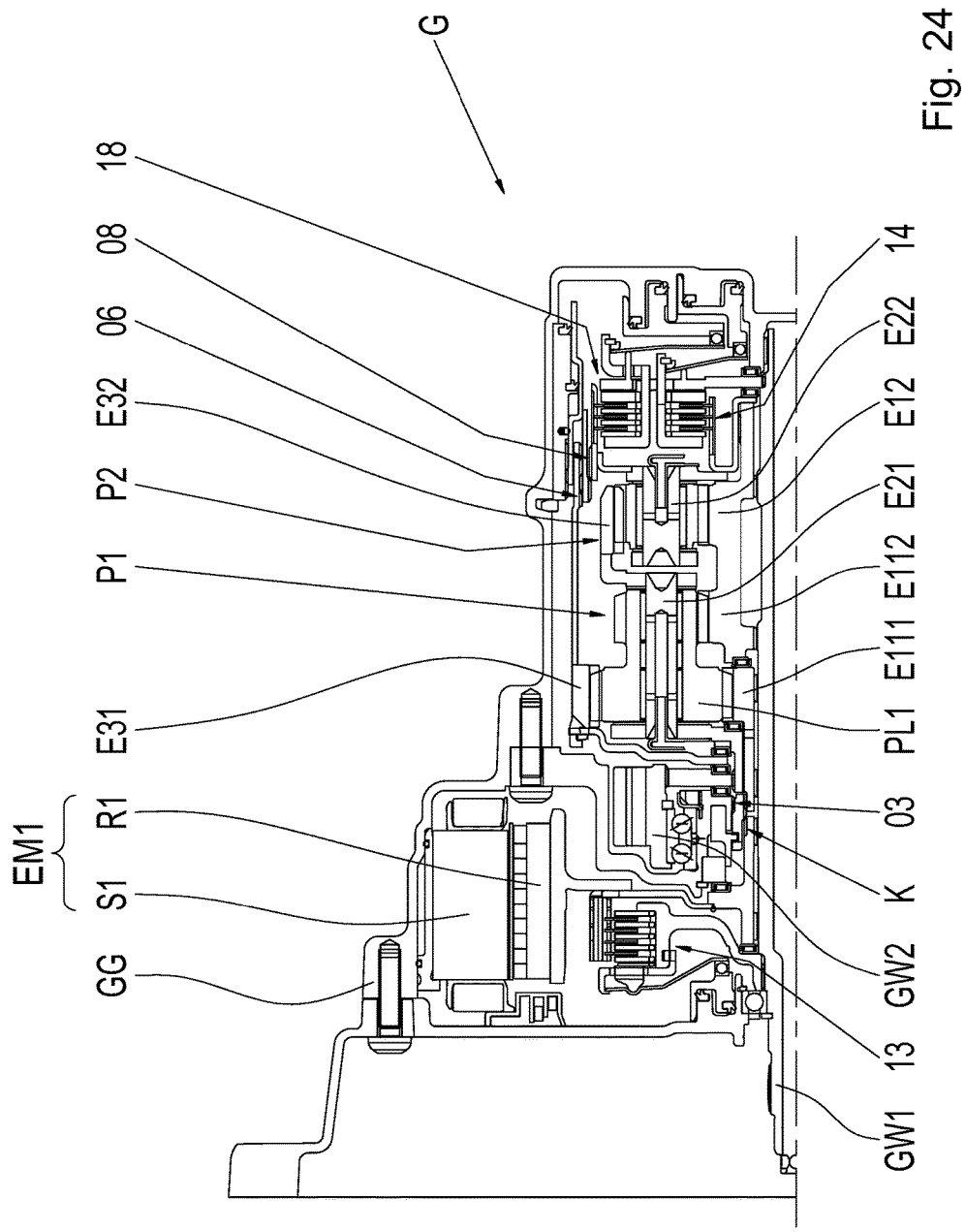
FIG. 24 is a sectional view of the transmission according to the ninth exemplary embodiment, with a positively engaging fifth shift element.

FIG. 24 shows a sectional view of the transmission G according to the ninth exemplary embodiment. The basic construction of the transmission G corresponds in this case to the fifth exemplary embodiment shown in FIG. 12, supplemented by the auxiliary shift element K and the fifth shift element 03. The auxiliary shift element K and the fifth shift element 03 are in this case in the form of positively engaging shift elements, and are arranged radially within the output shaft bearing arrangement. In the ninth exemplary embodiment, too, the auxiliary shift element K and the fifth shift element 03 have a common actuation means, which holds either the auxiliary shift element K or the fifth shift element 03 in the closed state.

FIG. 25 shows detailed views of the ninth exemplary embodiment for the arrangement of the auxiliary shift element Z and of the fifth shift element 03. A first element SM3 is guided radially in a recess of the housing GG and can be displaced in the axial direction by exertion of hydraulic pressure. The first element SM3 accordingly serves as a hydraulic piston. Through a driving projection, the first element SM3 is connected to a second element SM4, such that the second element SM4 is displaced axially in the same direction as the first element SM3. Between the first and second elements SM3, SM4, on the driving projection, there is provided a bearing arrangement which permits a rotational speed differential between the first and second elements SM3, SM4. The second element SM4 has, on its outer diameter, a dog toothing which, depending on the axial position of the elements SM3, SM4, can engage with a dog toothing formed on the housing GG. A dog toothing is likewise formed on the inner diameter of the second element SM4. A dog toothing is formed on the outer diameter of a connecting shaft WR1 which is connected to the rotor R1 of the first electric machine EM1. A further dog toothing is formed on the outer diameter of a connecting shaft W3, which is connected to the first sun gear E111 of the first planetary gear set P1.

FIG. 25a shows a first axial position of the elements SM3, SM4. In said position, the dog toothing formed on the outer circumference of the second element SM4 does not engage with the dog toothing formed on the housing GG. Instead, the dog toothing formed on the inner diameter of the second element SM4 engages with the dog toothings of the connecting shafts WR1, W3. In the illustrated position, the auxiliary shift element K is closed, and the fifth shift element 03 is open.

FIG. 25b shows a second axial position of the elements SM3, SM4. In said position, the dog toothing formed on the outer circumference of the second element SM4 engages with the dog toothing formed on the housing GG. The second element SM4 is thus rotationally fixed. The dog toothing formed on the inner diameter of the second element SM4 engages with the dog toothing formed on the connecting shaft W3. The dog toothing formed on the connecting shaft WR1 is not in engagement. In the illustrated position, the fifth shift element 03 is thus closed, and the auxiliary shift element K is open.

FIG. 25c illustrates an alternative embodiment of the actuation of the fifth shift element 03. The second element SM4 is in this case of two-part design, wherein the dog toothing that was previously formed on the outer diameter of the second element SM4 is now formed on a separate component SM5. A further dog toothing is formed between the separate component SM5 and the second element SM4. The separate component SM5 is preloaded in an axial direction by a spring which forces the dog toothing between the separate component SM5 and the second element SM4 in a closing direction. Through this embodiment, the fifth shift element 03 is in the form of a two-stage positively engaging shift element, which improves the closing process under load.

It should be mentioned at this point that the common actuation of fifth shift element 03 and auxiliary shift element K as shown in FIG. 25 is not imperative. In alternative refinements, the fifth shift element 03 and the auxiliary shift element K may also be actuated independently of one another.

FIG. 26a shows an engagement sequence table for the transmission G according to the eighth exemplary embodiment. Here, the first and second shift elements 14, 18 are in the form of frictionally engaging shift elements. The auxiliary shift element K is closed in all forward gear ratios and operating modes aside from the fifth and sixth forward gear ratios G5, G6. The fifth forward gear ratio G5 is formed by closing the fifth shift element 03 and the first shift element 18, wherein the third shift element 13 may optionally also be closed. If the third shift element 13 is closed, then the first electric machine EM1 can output or receive power in the fifth forward gear ratio G5 too. The sixth forward gear ratio G6 is formed by closing the fifth shift element 03 and the second shift element 14, wherein the third shift element 13 may optionally also be closed. If the third shift element 13 is closed, the first electric machine EM1 can also output or receive power in the sixth forward gear ratio G6.

If the first and second shift elements 18, 14 in the transmission G according to the eighth exemplary embodiment are in the form of positively engaging shift elements, the engagement sequence table as per FIG. 26a likewise applies, without the sixth forward gear ratio G6.

FIG. 26b shows an engagement sequence table for the transmission G according to the ninth exemplary embodiment, which includes the sixth shift element 08, wherein the first and second shift elements 14, 18 are in the form of frictionally engaging shift elements. In the fifth and sixth forward gear ratios G5, G6, the third shift element 13 is optionally closed, in particular if it is intended that the first electric machine EM1 supplies power to the transmission G or draws power from the transmission G. In the first reverse gear ratio GR, not only the third shift element 13 and the sixth shift element 08 but also the auxiliary shift element K is closed. In the second reverse gear ratio GR2, the auxiliary shift element K is optionally closed. The auxiliary shift element K should be closed in the second reverse gear ratio GR2 in particular if it is intended that the first electric machine EM1 supports operation in the second reverse gear ratio GR2. In the second electric operating mode E2, not only the sixth shift element 08 but also the auxiliary shift element K is closed. In the parking lock mode P, it is possible for not only the fourth shift element 06 and the sixth shift element 08 but optionally also the fifth shift element 03 and/or the auxiliary shift element K to be closed. If the actuation of the auxiliary shift element K and of the fifth shift element 03 is configured such that one of said two shift elements K, 03 is always closed, it is preferably the auxiliary shift element K that is closed.

FIG. 27a shows an alternative engagement sequence table for the transmission G according to the eighth exemplary embodiment, which differs in particular in terms of the formation of the second and third forward gear ratios G2', G3'. The second forward gear ratio G2' is formed by closing the fourth shift element 06 and the second shift element 14. The fifth shift element 03 and the auxiliary shift element K are open. The third forward gear ratio G3' is formed by closing the fourth shift element 06 and the first shift element 18. The fifth shift element 03 and the auxiliary shift element K are open. If it is intended that the first electric machine EM1 supplies power to or receives power from the transmission G in the second or third forward gear ratio G2', G3', then the third shift element 13 is optionally closed.

FIG. 27b shows an alternative engagement sequence table for the transmission G according to the ninth exemplary embodiment. The formation of the second and third forward gear ratios G2', G3' corresponds to the embodiment shown in FIG. 26a.

If the transmission G has the auxiliary shift element K, the following alternative formation of the fourth forward gear ratio G4 is possible. In principle, the fourth forward gear ratio G4 may be formed by closing two of the following shift elements: first shift element 18, second shift element 14, third shift element 13. Here, the first shift element 18 is preferably always involved in the formation of the fourth forward gear ratio G4, because the first shift element 18 is also involved in the third and fifth forward gear ratios G3, G3', G5. If the fourth forward gear ratio G4 is formed by closing the first and second shift elements 18, 14, then the auxiliary shift element K may also be open. Here, if it is the intention that the first electric machine EM1 outputs or receives power, then the third shift element 13 must be closed.

If the transmission G has the auxiliary shift element K, the following alternative formation of the second reverse gear ratio GR2 is possible. The second reverse gear ratio GR2 may accordingly also be formed by closing the sixth shift element 08 and the second shift element 14, with the auxiliary shift element K being open. Here, if it is the intention that the first electric machine EM1 outputs or receives power, then the third shift element 13 must be closed.

If the first and second shift elements 18, 14 in the transmission G according to the ninth exemplary embodiment are in the form of positively engaging shift elements, the engagement sequence table as per FIG. 26a likewise applies, without the sixth forward gear ratio G6.

The transmissions G according to the eighth and ninth exemplary embodiments could optionally also have the seventh shift element 07. For the sake of simplicity, this is not illustrated in the figures. In the seventh forward gear ratio G7 that is thus formed, not only the seventh shift element 07 and the third shift element 13 but also the auxiliary shift element K must be closed.

All of the illustrated exemplary embodiments and embodiments of the invention may have the second electric machine EM2, as illustrated in FIG. 5.

The hydraulic actuation of the shift elements including the auxiliary shift element K, as illustrated in the exemplary embodiments, is to be regarded merely as an example. In alternative refinements, the actuation of selected shift elements or of all of the shift elements including the auxiliary shift element K may also be realized by one or more electromechanical actuation devices.

Figure 28:
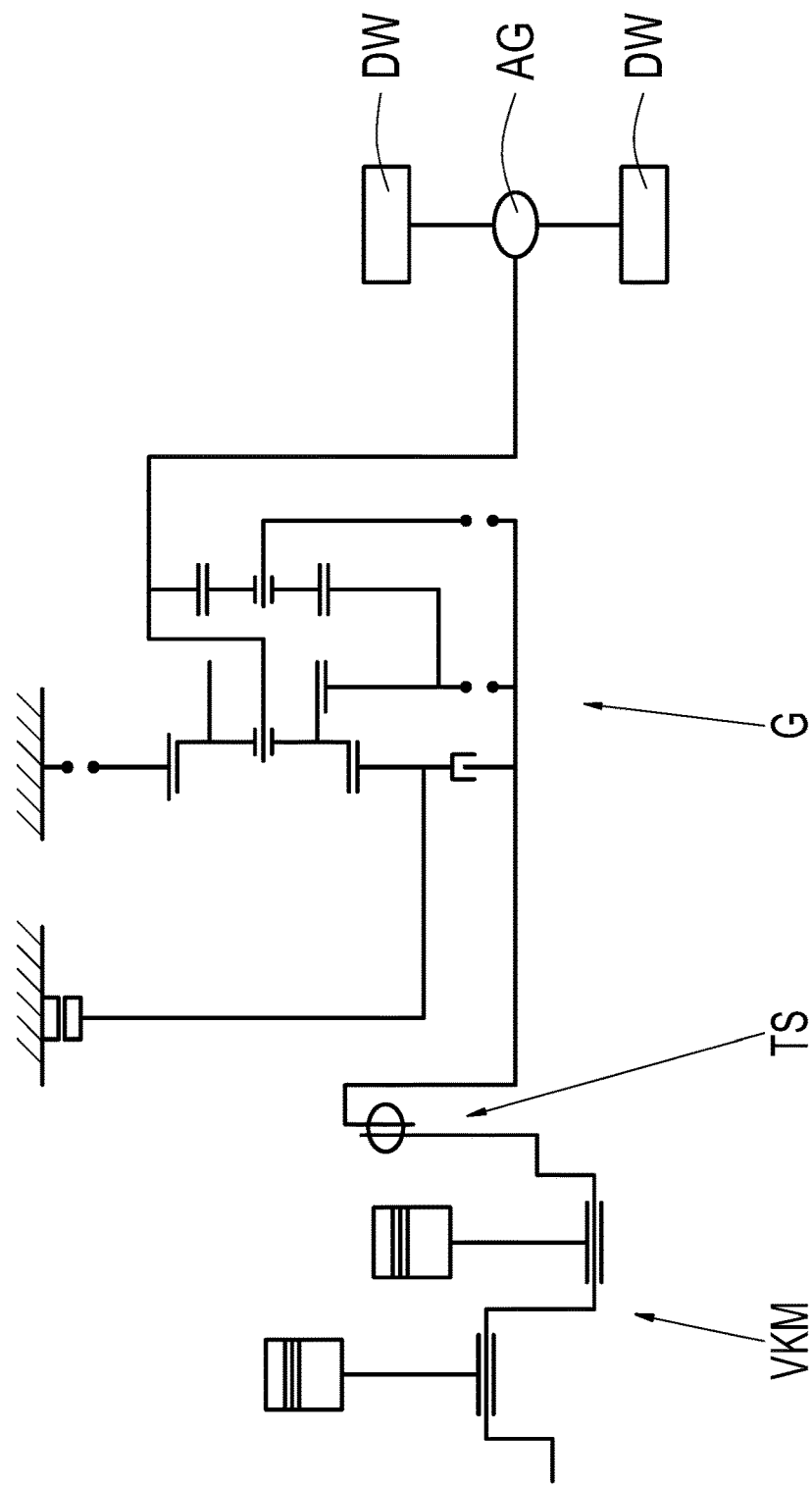
FIG. 28 is a drivetrain for a motor vehicle.

FIG. 28 schematically shows a drivetrain of a motor vehicle. The drivetrain has an internal combustion engine VKM which is connected to the input shaft GW1 of the transmission G by a torsional vibration damper TS. The output shaft GW2 is operatively connected in terms of drive to an axle transmission AG. Proceeding from the axle transmission AG, the power that acts at the output shaft GW2 is distributed to wheels DW of the motor vehicle. During motor operation of the first electric machine EM1, electric power is supplied to the stator S1 by an inverter that is not illustrated. During generator operation of the first electric machine EM1, the stator S1 supplies electrical power to the inverter. Here, the inverter converts the direct-current voltage of an energy store (not illustrated) into an alternating-current voltage suitable for the first electric machine EM1, and vice versa. FIG. 27 shows the transmission G according to the first exemplary embodiment. This is to be regarded merely as an example. The hybrid drivetrain could be constructed with any embodiment of the transmission G.

Modifications and variations can be made to the embodiments illustrated or described herein without departing from the scope and spirit of the invention as set forth in the appended claims.

REFERENCE DESIGNATIONS

G Transmission
GW1 Input shaft
GW2 Output shaft
GW2' Output shaft
P1 First planetary gear set
P2 Second planetary gear set
E111 First sun gear of the first planetary gear set
E112 Second sun gear of the first planetary gear set
E21 Carrier of the first planetary gear set
E31 Ring gear of the first planetary gear set
E312 Second ring gear of the first planetary gear set
E12 Sun gear of the second planetary gear set
E22 Carrier of the second planetary gear set
E32 Ring gear of the second planetary gear set
E322 Second ring gear of the second planetary gear set
18 First shift element
14 Second shift element
13 Third shift element
06 Fourth shift element
03 Fifth shift element
08 Sixth shift element
07 Seventh shift element
K Auxiliary shift element
W8 Connecting shaft
W6 Connecting shaft
W3 Connecting shaft
WR1 Connecting shaft
SM1 First element
SM2 Second element
SM3 First element
SM4 Second element
SM5 Component
EM1 First electric machine
R1 Rotor of the first electric machine
S1 Stator of the first electric machine
EM2 Second electric machine
R2 Rotor of the second electric machine
S2 Stator of the second electric machine
G1-G7 First to seventh forward gear ratio
GR Reverse gear ratio
GR2 Second reverse gear ratio
EDA1 First electrodynamic operating mode
EDA2 Second electrodynamic operating mode
E1 First electric operating mode
E2 Second electric operating mode
P Parking lock
VKM Internal combustion engine
DW Wheels
AG Axle transmission
TS Torsional vibration damper

The invention claimed is:

1. A transmission (G) for a motor vehicle, comprising:
    an input shaft (GW1);
    an output shaft (GW2);
    a first planetary gear set (P1), wherein the first planetary gear set is a stepped planetary gear set and comprises planet gears (PL1) having two different effective diameters;
    a second planetary gear set (P2); and
    a first electric machine (EM1) with a rotationally fixed stator (S1) and a rotatable rotor (R1);
    wherein the first and the second planetary gear sets (P1, P2) are minus gear sets;
    a first sun gear (E111) of the first planetary gear set (P1) engages with the larger effective diameter planet gears (PL1), the first sun gear (E111) of the first planetary gear set (P1) is either permanently connected or connectable by an auxiliary shift element (K) to the rotor (R1) of the first electric machine (EM1);
a second sun gear (E112) of the first planetary gear set (P1) engages with the smaller effective diameter planet gears (PL1), the second sun gear (E112) is permanently connected to a sun gear (E12) of the second planetary gear set (P2);
a carrier (E21) of the first planetary gear set (P1) is permanently connected to a ring gear (E32) of the second planetary gear set (P2);
the input shaft (GW1) is connectable by a first shift element (18) to the carrier (E22) of the second planetary gear set (P2), the input shaft (GW1) is connectable by a second shift element (14) to the second sun gear (E112) of the first planetary gear set (P1), and the input shaft (GW1) is connectable by a third shift element (13) to the rotor (R1) of the first electric machine (EM1);
the output shaft (GW2) is connected to the ring gear (E32) of the second planetary gear set (P2); and
a ring gear (E31) of the first planetary gear set (P1) is rotationally fixable by a fourth shift element (06).

2. The transmission (G) according to claim 1, wherein the first sun gear (E111) of the first planetary gear set (P1) is rotationally fixable by a fifth shift element (03).

3. The transmission (G) according to claim 2, wherein:
the first sun gear (E111) of the first planetary gear set (P1) is permanently connected to the rotor (R1);
at least five forward gear ratios (G1, G2, G3, G4, G5) between the input shaft (GW1) and the output shaft (GW2) are selectable by selective actuation of the first, second, third, fourth and fifth shift elements (18, 14, 13, 06, 03);
the first forward gear ratio (G1) realized by closing the fourth shift element (06) and the third shift element (13);
the second forward gear ratio (G2) realized by closing the fourth shift element (06) and the second shift element (14);
the third forward gear ratio (G3) realized by closing the fourth shift element (06) and the first shift element (18);
the fourth forward gear ratio (G4) realized by closing the first shift element (18) and optionally the third shift element (13) or the second shift element (14); and
the fifth forward gear ratio (G5) realized by closing the first shift element (18) and either by closing the fifth shift element (03) or by supporting the first sun gear (E111) of the first planetary gear set (P1) with the first electric machine (EM1).

4. The transmission (G) according to claim 2, wherein:
the first sun gear (E111) of the first planetary gear set (P1) is connectable to the rotor (R1) of the first electric machine (EM1) by the auxiliary shift element (K);
at least five forward gear ratios (G1, G2, G3, G4, G5) between the input shaft (GW1) and the output shaft (GW2) are shiftable by selective actuation of the first, second, third, fourth and fifth shift elements (18, 14, 13, 06, 03) and of the auxiliary shift element (K);
the first forward gear ratio (G1) realized by closing the fourth shift element (06), the third shift element (13) and the auxiliary shift element (K);
the second forward gear ratio (G2) realized by closing the fourth shift element (06), the second shift element (14) and the auxiliary shift element (K);
the third forward gear ratio (G3) realized by closing the fourth shift element (06), the first shift element (18) and the auxiliary shift element (K);
the fourth forward gear ratio (G4) realized by closing the first shift element (18), the auxiliary shift element (K) and optionally the third shift element (13) or the second shift element (14); and
the fifth forward gear ratio (G5) realized by closing the first shift element (18) and the fifth shift element (03).

5. The transmission (G) according to claim 2, wherein:
the first sun gear (E111) of the first planetary gear set (P1) is connectable to the rotor (R1) of the first electric machine (EM1) by the auxiliary shift element (K);
at least five forward gear ratios (G1, G2', G3', G4, G5) between the input shaft (GW1) and the output shaft (GW2) are shiftable by selective actuation of the first, second, third, fourth and fifth shift elements (18, 14, 13, 06, 03) and of the auxiliary shift element (K);
the first forward gear ratio (G1) realized by closing the fourth shift element (06), the third shift element (13) and the auxiliary shift element (K);
the second forward gear ratio (G2) realized by closing the fourth shift element (06) and the second shift element (14);
the third forward gear ratio (G3') realized by closing the fourth shift element (06) and the first shift element (18);
the fourth forward gear ratio (G4) realized by closing the first shift element (18), the auxiliary shift element (K) and optionally the third shift element (13) or the second shift element (14); and
the fifth forward gear ratio (G5) realized by closing the first shift element (18) and the fifth shift element (03).

6. The transmission (G) according to claim 1, wherein the first, second and fourth shift elements (18, 14, 06) are dog-clutches, and the third shift element (13) is a multi-plate clutch.

7. The transmission (G) according to claim 6, wherein the first shift element (18) and the third shift element (13) are closed in the fourth forward gear ratio (G4), and the first shift element (18) and the second shift element (14) are actuatable by a common actuation mechanism.

8. The transmission (G) according to claim 1, wherein the first, second and third shift elements (18, 14, 13) are multi-plate clutches, and the fourth shift element (06) is a dog-clutch.

9. The transmission (G) according to claim 8, wherein the first sun gear (E111) of the first planetary gear set (P1) is permanently connected to the rotor (R1) of the first electric machine (EM1), the transmission (G) has a sixth forward gear ratio (G6) which is realized by closing the second shift element (14) and either by closing the fifth shift element (03) or by supporting the first sun gear (E111) of the first planetary gear set (P1) with the first electric machine (EM1).

10. The transmission (G) according to claim 8, wherein the transmission (G) has the auxiliary shift element (K) and the fifth shift element (03), and the sixth forward gear ratio (G6) is realized by closing the fifth shift element (03) and the second shift element (14).

11. The transmission (G) according to claim 1, wherein the carrier (E22) of the second planetary gear set (P2) is rotationally fixable by a sixth shift element (08), and a first reverse gear ratio (GR) is realized by closing the sixth shift element (08), the third shift element (13) and the auxiliary shift element (K).

12. The transmission (G) according to claim 11, wherein, in addition to or alternatively to the first reverse gear ratio (GR), a second reverse gear ratio (GR2) is realized by closing the sixth shift element (08) and the second shift element (14).

13. The transmission (G) according to claim 11, wherein the second planetary gear set (P2) has a second ring gear (E322) which is connected to the output shaft (GW2), the connection between the carrier (E22) of the second planetary gear set (P2) and the sixth shift element (08) leading through and between the two ring gears (E32, E322) of the second planetary gear set (P2).

14. The transmission (G) according to claim 11, wherein the fourth shift element (06) and the sixth shift element (08) are actuatable by a common actuation mechanism.

15. The transmission (G) according to claim 11, wherein the sixth shift element (08) and the auxiliary shift element (K) are closed and all further shift elements (18, 14, 13, 06, 03, 07) are open and the torque acting at the output shaft (GW2) is continuously variable through variation of the torque acting at the rotor (R1) of the first electric machine (EM1) in a second electric operating mode (E2).

16. The transmission (G) according to claim 11, wherein the sixth shift element (08) and the fourth shift element (06) are closable to provide a parking lock (P).

17. The transmission (G) according to claim 1, wherein:
the ring gear (E31) of the first planetary gear set (P1) engages with the larger effective diameter planet gears (PL1) and is rotationally fixable by the fourth shift element (06); and
a second ring gear (E312) of the first planetary gear set (P1) engages with the smaller effective diameter planet gears (PL1), and the second ring gear (E312) of the first planetary gear set (P1) is rotationally fixable by a seventh shift element (07).

18. The transmission (G) according to claim 17, wherein:
the seventh shift element (07) is open in the first through sixth forward gear ratios (G1-G6); and
the seventh shift element (07), the third shift element (13) and the auxiliary shift element (K) are closed in a seventh forward gear ratio (G7).

19. The transmission (G) according to claim 1, wherein the transmission (G) has a second electric machine (EM2) with a rotationally fixed stator (S2) and a rotatable rotor (R2), and the rotor (R2) of the second electric machine (EM2) is permanently connected to the input shaft (GW1).

20. The transmission (G) according to claim 1, wherein in a first electrodynamic operating mode (EDA1), the second shift element (14) and the auxiliary shift element (K) are closed and all further shift elements (18, 13, 06, 03, 08, 07) are open, the torque acting at the output shaft (GW2) being continuously variable through variation of the torque acting at the input shaft (GW1) and of the torque acting at the rotor (R1) of the first electric machine (EM1).

21. The transmission (G) according to claim 1, wherein the first shift element (18) and the auxiliary shift element (K) are closed and all further shift elements (14, 13, 06, 03, 08, 07) are open and the torque acting at the output shaft (GW2) is continuously variable through variation of the torque acting at the input shaft (GW1) and of the torque acting at the rotor (R1) of the first electric machine (EM1) in a second electrodynamic operating mode (EDA2).

22. The transmission (G) according to claim 1, wherein the fourth shift element (06) and the auxiliary shift element (K) are closed and all further shift elements (18, 14, 13, 03, 08, 07) are open and the torque acting at the output shaft (GW2) is continuously variable through variation of the torque acting at the rotor (R1) of the first electric machine (EM1) in a first electric operating mode (E1).

23. The transmission (G) according to claim 1, wherein all shift elements (18, 14, 13, 06, 03, 08, 07) are actuatable by a closed hydraulic system which comprises a pressure accumulator or by an electromechanical actuation system.

24. A drivetrain for a motor vehicle, wherein the drivetrain comprises the transmission (G) of claim 1, an internal combustion engine (VKM), and an axle transmission (AG) connected to wheels (DW) of the motor vehicle,
wherein the input shaft (GW1) of the transmission (G) is connected to the internal combustion engine (VKM) by at least one torsional vibration damper (TS);
the output shaft (GW2) of the transmission (G) is operatively connected to the axle transmission (AG); and
the motor vehicle is driven by the internal combustion engine (VKM) alone in the forward gear ratios (G1-G5; G6; G7), by interaction of the internal combustion engine (VKM) and the first electric machine (EM1) in a first and second electrodynamic operating modes (EDA1, EDA2), and by the first electric machine (EM1) alone in the first electric operating mode (E1).

* * * * *